(12) United States Patent
Sanford et al.

(10) Patent No.: US 9,721,430 B2
(45) Date of Patent: *Aug. 1, 2017

(54) SYSTEMS AND METHODS FOR POKER GAMEPLAY FUNDING

(71) Applicant: Sightline Interactive LLC, Las Vegas, NV (US)

(72) Inventors: Kirk E. Sanford, Las Vegas, NV (US); Thomas M. Sears, Henderson, NV (US); Omer Sattar, Las Vegas, NV (US)

(73) Assignee: Sightline Interactive LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,521

(22) Filed: Dec. 7, 2015

(65) Prior Publication Data

US 2016/0093164 A1    Mar. 31, 2016

Related U.S. Application Data

(63) Continuation of application No. 14/494,648, filed on Sep. 24, 2014, now Pat. No. 9,245,413, which is a
(Continued)

(51) Int. Cl.
*G07F 17/32* (2006.01)
*G06Q 20/10* (2012.01)
(Continued)

(52) U.S. Cl.
CPC ......... *G07F 17/3244* (2013.01); *G06Q 20/10* (2013.01); *G06Q 20/227* (2013.01);
(Continued)

(58) Field of Classification Search
USPC .......................................................... 463/13
See application file for complete search history.

(56) References Cited

U.S. PATENT DOCUMENTS 5,902,983 A    5/1999  Crevelt et al.
6,508,710 B1   1/2003  Paravia et al.
(Continued)

OTHER PUBLICATIONS

"Sightline Payments Along With Industry Leading Partners Announces Loyalty Card Plus Prepaid Card For The Gaming Industry"; <http://www.businesswire.com/news/home/20120926006091/en>; Sep. 26, 2012; 2 pages.
(Continued)

*Primary Examiner* — Pierre E Elisca
(74) *Attorney, Agent, or Firm* — Ulmer & Berne LLP

(57) ABSTRACT

Systems and methods for poker gameplay funding are disclosed through the crediting gaming accounts and the debiting of a stored value account. The stored value account can be linked to a stored value payment vehicle issued to a player. Funds held by the stored value account can be used for tournament poker play and cash game buy-in in virtual poker rooms and brick-and-mortar poker rooms. At the conclusion of gameplay, the gaming account can be debited and the stored value account credit to reflect poker winnings.

22 Claims, 19 Drawing Sheets

US 9,721,430 B2
Page 2

Related U.S. Application Data continuation-in-part of application No. 14/326,527, filed on Jul. 9, 2014, now Pat. No. 9,196,123, which is a continuation-in-part of application No. 14/228,363, filed on Mar. 28, 2014, now Pat. No. 8,998,708, which is a continuation of application No. 14/033,493, filed on Sep. 22, 2013, now Pat. No. 8,708,809.

(60) Provisional application No. 61/744,564, filed on Sep. 28, 2012.

(51) Int. Cl.
   *G06Q 20/22* (2012.01)
   *G06Q 50/34* (2012.01)
   *G06Q 20/28* (2012.01)
   *G06Q 20/36* (2012.01)
   *G07F 19/00* (2006.01)
   *G06Q 30/02* (2012.01)

(52) U.S. Cl.
   CPC ......... *G06Q 20/28* (2013.01); *G06Q 20/3676* (2013.01); *G06Q 30/0207* (2013.01); *G06Q 50/34* (2013.01); *G07F 17/322* (2013.01); *G07F 17/3251* (2013.01); *G07F 17/3255* (2013.01); *G07F 17/3293* (2013.01); *G07F 19/20* (2013.01)

(56) References Cited

U.S. PATENT DOCUMENTS

| | | |
|---|---|---|
| 7,035,626 B1 | 4/2006 | Luciano, Jr. |
| 7,618,324 B2 | 11/2009 | Gatto et al. |
| 8,113,948 B1 | 2/2012 | Coronel |
| 8,201,229 B2 | 6/2012 | Ruppert et al. |
| 8,282,468 B2 | 10/2012 | Huntley et al. |
| 8,333,653 B2 | 12/2012 | Nyman et al. |
| 8,550,900 B2 | 10/2013 | Walker et al. |
| 2001/0054003 A1 | 12/2001 | Chien et al. |
| 2002/0152125 A1 | 10/2002 | Goedde |
| 2003/0003983 A1 | 1/2003 | Walker et al. |
| 2003/0236120 A1 | 12/2003 | Reece et al. |
| 2004/0254010 A1 | 12/2004 | Fine |
| 2005/0033645 A1 | 2/2005 | Duphily |
| 2005/0054439 A1 | 3/2005 | Rowe et al. |
| 2005/0288095 A1 | 12/2005 | Walker et al. |
| 2006/0154722 A1 | 7/2006 | Walker et al. |
| 2006/0211488 A1 | 9/2006 | Walker et al. |
| 2006/0273155 A1 | 12/2006 | Thackston |
| 2007/0004509 A1 | 1/2007 | Banton |
| 2008/0113776 A1 | 5/2008 | Sommer |
| 2008/0139306 A1 | 6/2008 | Lutnick et al. |
| 2009/0048012 A1 | 2/2009 | Patel et al. |
| 2010/0076892 A1 | 3/2010 | Babi et al. |
| 2011/0145139 A1 | 6/2011 | Valdes et al. |
| 2011/0151964 A1 | 6/2011 | Race |
| 2011/0231314 A1 | 9/2011 | Sears et al. |
| 2012/0088575 A1* | 4/2012 | Walker .................. G07F 17/32 463/25 |
| 2012/0123943 A1 | 5/2012 | Potts et al. |
| 2012/0129586 A1* | 5/2012 | Lutnick .................. G07F 17/32 463/16 |
| 2012/0142403 A1 | 6/2012 | Prather et al. |
| 2012/0166265 A1 | 6/2012 | Rowe et al. |
| 2012/0191977 A1 | 7/2012 | Foster et al. |
| 2013/0046675 A1 | 2/2013 | Chiulli et al. |
| 2013/0172075 A1* | 7/2013 | Gagner .................. G06Q 20/04 463/25 |
| 2013/0311376 A1 | 11/2013 | Blair et al. |
| 2014/0011561 A1* | 1/2014 | Lutnick .................. G07F 17/32 463/17 |
| 2014/0370958 A1* | 12/2014 | Lutnick ............... G07F 17/3276 463/17 |

OTHER PUBLICATIONS

International Search Report and Written Opinion for PCT Patent Application No. PCT/US2013/062074, mailed on Jul. 8, 2014, 11 pages.

* cited by examiner

SYSTEMS AND METHODS FOR POKER GAMEPLAY FUNDING

CROSS-REFERENCE TO RELATED APPLICATIONS

This application is a continuation of prior application U.S. patent application Ser. No. 14/494,648, "SYSTEMS AND METHODS FOR POKER GAMEPLAY FUNDING," which is a continuation-in-part of prior application U.S. patent application Ser. No. 14/326,527, now U.S. Pat. No. 9,196,123, entitled "SYSTEMS AND METHODS FOR BALANCE TRANSFERS ASSOCIATED WITH GAMING ENVIRONMENTS," filed on Jul. 9, 2014, which is a continuation-in-part of prior application U.S. patent application Ser. No. 14/228,363, now U.S. Pat. No. 8,998,708, entitled "SYSTEMS AND METHODS FOR ADMINISTRATION OF NON-WAGERING ACCOUNT ASSOCIATED WITH GAMING ENVIRONMENT," filed on Mar. 28, 2014, which is a continuation of prior application U.S. patent application Ser. No. 14/033,493, now U.S. Pat. No. 8,708,809, entitled "SYSTEMS AND METHODS FOR ADMINISTRATION OF NON-WAGERING ACCOUNT ASSOCIATED WITH GAMING ENVIRONMENT," filed Sep. 22, 2013, now U.S. Pat. No. 8,708,809, which claims priority to the disclosure of U.S. Provisional Patent Application Ser. No. 61/744,564, entitled "DUAL PREPAID/LOYALTY CARD FOR GAMING," filed Sep. 28, 2012, the disclosures of which are all incorporated herein by reference in their entirety.

BACKGROUND

Within gaming establishments, such as casinos, gaming devices are typically networked via a central computer. Such configuration allows for the gaming establishment to monitor a player's gameplay for tracking purposes. Gaming devices typically issue paper tickets that are redeemable for cash. These paper tickets can be redeemed either at assisted-service counters (i.e., a casino cage) or through self-service computer systems, sometimes called Ticket-In-Ticket-Out (TITO) machines. Drawbacks of using paper tickets, however, is that the players may very easily lose tickets, tickets can become destroyed or damaged, casinos incur cost from replenishing tickets, and casinos incur cost for maintaining ticket printers. Additionally, the use of tickets requires that operators of casinos ensure that sufficient amounts of cash are available on the gaming floor to accommodate redemptions at both the assisted-service counters and the TITO machines. Players wishing to play a table game at a casino typically first exchange cash for an amount of chips which can then be used for gaming. When the player wants to convert the chips back to the cash, the player typically exchanges their chips for an equivalent amount of cash at a cashier cage at the casino. Thus, in addition to ensure sufficient cash is available for ticket redemptions, operators of casinos must ensure also sufficient amounts of cash are available at the cashier cage to accommodate player exchanging chips for cash. This process for routinely replenishing cash by the casino operator is both costly and burdensome.

Additionally, in many gaming establishments players can register demographic information to obtain a player card, sometimes referred to as a loyalty card. Typical player cards include a unique identifier that enables the casino to centrally track the player's wagering activity. Applying the player's historic activity, the gaming establishment can, for example, develop a targeted marketing campaign including promotions, gifts, and advertisements. A problem with casino loyalty systems, however, is that they do not capture spending player activity that occurs in non-gaming environments, such the player's purchases at a merchant or the player's ATM activity.

Therefore, the field can benefit from systems and methods providing cashless wagering and redemption, which provides advantages to both game players and casino operators. The field can also benefit from systems and methods that conveniently allow a gaming establishment to track player gaming activity and player purchase activity, both inside and outside the casino, to associate such activity with the player's loyalty profile.

SUMMARY

In an embodiment, the present disclosure is directed, in part, to a poker gameplay funding system. The poker gameplay funding system comprises a stored value payment vehicle issued to a player, where funds accessible by the stored value payment vehicle are maintained in a stored value account and are accessible through a payment network. The poker gameplay funding system also comprises a gaming account to hold funds for the player. The poker gameplay funding system also comprises at least one processor and non-transitory computer readable medium having instructions stored thereon which when executed by a processor cause the processor to selectively increase the funds of the gaming account and decrease the funds of the stored value account, where the funds held by the gaming account are usable by the player for the poker gameplay funding.

In another embodiment, the present disclosure is directed, in part, to a computer-based method of funding poker gameplay. The method comprises receiving, by one or more processors, player credentials for a player, where the player credentials are associated with a player identifier and a gaming account having a balance. The method also comprises, based at least partially on the player identifier, identifying, by any of the one or more processors, a stored value account, where the stored value account is associated with a stored value payment vehicle issued to the player, and where a balance of the stored value account is maintained by an issuer processor computing system. The method also comprises, receiving, by any of the one or more processors, a poker gameplay funding instruction, where the funding gameplay instruction identifies a balance amount to be transferred from the stored valued account to the gaming account. The method also comprises, causing, by any of the one or more processors, a decrease of the balance of the stored value account and an increase of the balance of the gaming account.

In another embodiment, the present disclosure is directed, in part, to a computer-based method of funding an account associated with a player. The method comprises receiving, by a transaction facilitator computing system, a poker gameplay funding request, wherein the poker gameplay funding request comprises a request to fund a gaming account with player funds held by a stored value account associated with a stored value payment vehicle, wherein the gaming account has a balance amount and causing, by the transaction facilitator computing system, an increase of the balance amount of the gaming account based on an amount of funds requested in the poker gameplay funding request.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
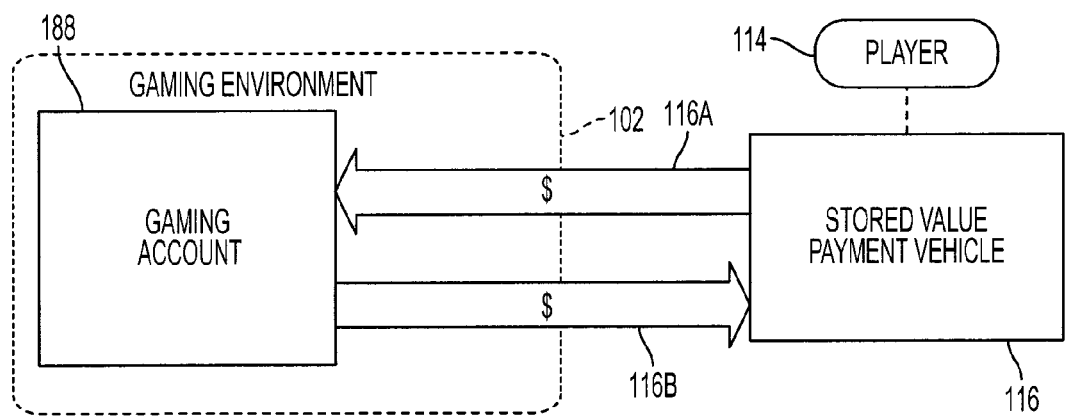
FIG. 1 schematically illustrates an association between a stored value payment vehicle and a gaming account in accordance with one non-limiting embodiment of the present disclosure.

The presently disclosed system and methods can generally allow for gaming-related financial transactions. As described in more detail below, utilizing a financial facilitator, a player can selectively transfer funds between various types of gaming accounts and an associated account, such as a stored value account and/or a casino level player account. The stored value account can be a financial account that is maintained by an issuing financial institution, with funds in the stored value account accessible to the cardholder through an associated stored value payment vehicle using open-loop or closed-loop payment processing, for example. The stored value payment vehicle can be any suitable payment vehicle, such as a physical card, a virtual payment device, or have any other suitable format. In some embodiments the stored value payment vehicle is a general purpose reloadable prepaid card.

Gaming environments can utilize different types of gaming accounts, such as casino level player accounts and/or wagering accounts. With regard to wagering accounts, some types of wagering accounts are regulated by jurisdictional gaming statutes. For the purposes of illustration, three different types of wagering accounts are described herein (internet gaming wagering accounts, brick-and-mortar wagering accounts, and race-and-sports wagering accounts), although this disclosure is not so limited. In fact, the systems and methods described herein are generally applicable to the transfer of between any suitable wagering account and an associated stored value account, or intermediary account, such as a casino level player account, as described below.

As used herein, internet gaming wagering account (or iGaming wagering account), generally means an electronic ledger wherein the following types of transactions relative to internet or mobile gaming system are recorded: (a) deposits; (b) withdrawals; (c) amounts wagered; (d) amounts paid on winning wagers; (e) service or other transaction-related charges authorized by the patron; and (f) adjustments to the account.

As used herein, brick-and-mortar wagering account generally means an electronic ledger for a brick-and-mortar cashless wagering system patron deposit account wherein the following types of transactions are recorded to and from gaming devices (i.e.; slots): (a) deposits and withdrawals of cash or cash equivalents at a designated area of accountability; (b) deposits initiated with a debit instrument; (c) wagering account transfers to and from gaming devices; (d) wagering account adjustments.

As used herein, race-and-sports wagering account generally means an electronic ledger wherein the following types of transactions relative to sports and non-pari-mutuel race wagers are recorded: (a) deposits; (b) withdrawals; (c) amounts wagered; (d) amounts paid on winning wagers; (e) amounts paid for horse racing-related services or merchandise; (f) service or other transaction-related charges authorized by the patron; and (g) adjustments to the account.

As described in more detail below, a financial facilitator can generally direct or enable transactions with the issuing financial institution to affect the increasing and decreasing of an account balance of the stored value account. A financial facilitator can also generally direct or enable transactions with a computing system that manages a gaming account of a gaming environment to affect the increasing and decreasing of an account balance of the gaming account. The issuing financial institution can also receive communications related to the stored value account in a traditional fashion via an open system from merchants through existing bank card networks. Such communications can authorize/decline purchases using funds held in the stored value account.

In some embodiments, a player can be associated with a unique player identifier that can be used by a casino or other gaming environment to identify a particular player. Such a player identifier may be issued subsequent to the player enrolling in a casino loyalty program, for example. In some cases, the unique player identifier is embossed on a player card, sometimes referred to as a loyalty card, or is otherwise accessible or presentable by a player. In some embodiments, the player identifier can be a graphical code, such as a quick-response (QR) code displayable on a mobile computing device or the player identifier can be a barcode printed on a keychain fob or other substrate. In any event, the player identifier can be provided to a gaming device or casino representative to enable the casino to centrally track the player's wagering activity. The player identifier is linked by the issuing entity (such as a casino) a loyalty profile that can be stored or otherwise maintained by customer relationship software that is maintained by the casino or on behalf of the casino by an affiliated service provider.

As described in more detail below, a player identifier for a particular player can be linked to, or otherwise associated with, a stored value account held by a financial institution and accessible by the particular player. Such a linkage or association offers a variety of benefits, both to players and an associated casino. For example, in one example implementation, a player can interact with a gaming device (such as a slot machine) by providing a player identifier to the device. In some cases, additional credentials, such as a PIN or password, can be provided by the player. Through network communications, the gaming device can communicate with various computing platforms, such as a slot management system and/or casino management system, which generally may be referred to as a casino computing system, to authenticate the player's identity. Once authenticated, the player can selectively access funds that are maintained in the stored value account of an issuing financial institution for use at the gaming device. The casino computing system can communicate with a transaction facilitator (such as through API-calls, or other suitable communication techniques) to provide the information to identify the player that is seeking to access funds. In one embodiment, a player identifier of the player is provided to the transaction facilitator. As described in more detail below, the player identifier can be the loyalty account number or other type of identifier. The transaction facilitator, in turn, can determine a stored value account associated with that player and, through closed network communications with the issuing financial institution, dispatch appropriate messaging to debit the stored value account. Indication of a successful debit can be provided to the casino computing system by the transaction facilitator. The casino computing system can then credit a one or more gaming accounts of the player to increase their available balance. Funds, in the form of gaming credits, can then be distributed to the gaming device (sometimes referred to as a wagering account transfer in "WAT in"). At a later point in time, when the player wishes to "cash out," the credits of the gaming device can be transferred to a gaming account (sometimes referred to as a wagering account transfer out "WAT out"). Once received into the gaming account, the gaming credits can be converted to a fund amount and used to credit the stored value account, held in the gaming account, or even transferred to another gaming account.

In some embodiments, various transfers described below can be performed in substantially real-time. As used herein, substantially real-time means generally less than about 20 minutes, generally less than about 10 minutes, generally less that about 5 minutes, generally less than about 1 minutes, or generally less than about 30 seconds. Therefore, in the example described above, subsequent to the player "cashing out", the funds transferred to the stored value account can be accessible to make purchases using the associated stored value payment vehicle in substantially real-time The stored value payment vehicle can be, for example, a general purpose reloadable card (sometimes referred to as a GPR card) that is an open-loop payment vehicle. Being an open loop payment vehicle, it is associated with a bank card network (MASTERCARD, VISA, DISCOVER, and so forth) and can generally be used at any merchant or ATM accepting payment cards associated with the bank card network. Open loop transactions seeking authorization from funds of the stored value account send authorization requests to the issuing financial institution through an open bank card network. In accordance with the systems and methods disclosed herein, using secured communication links, the issuing financial institution can provide a financial facilitator with information based on stored value card transactions. The financial facilitator can determine a player identifier associated with that stored value account and then provide reporting to the casino computing system. This reporting can be used, for example, to supplement or update a loyalty profile of a player based on the increased knowledge about the player gained from tracking their spending.

Embodiments are hereinafter described in detail in connection FIGS. 1-16, wherein like numbers indicate the same or corresponding elements throughout the figures. It is noted that reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

FIG. 1 is a schematically illustrates an association between a stored value payment vehicle 116 and a gaming account 188 in accordance with one embodiment of the present disclosure. The gaming account 188 can be associated with a gaming environment 102. As used herein, gaming environment can refer to, without limitation, a brick-and-mortar casino, an online or virtual casino, and/or any other type of gaming website or other types of portal, such as real-money gaming websites (poker only, casino only, and poker and casino), social gaming websites where virtual credits can be purchased, horse racing websites, dog racing websites, real-money sports wagering websites, tournament buy-in portals for poker play at a physical location or online location, fantasy sports websites, websites selling lottery tickets or lottery games (including poker/casino/instant win), and the like, collectively referred to herein as, "gaming websites". The gaming account 188 illustrated in FIG. 1 can be any type of account that can be maintained by a gaming website or its affiliate that maintains a player's balance.

Figure 2A:
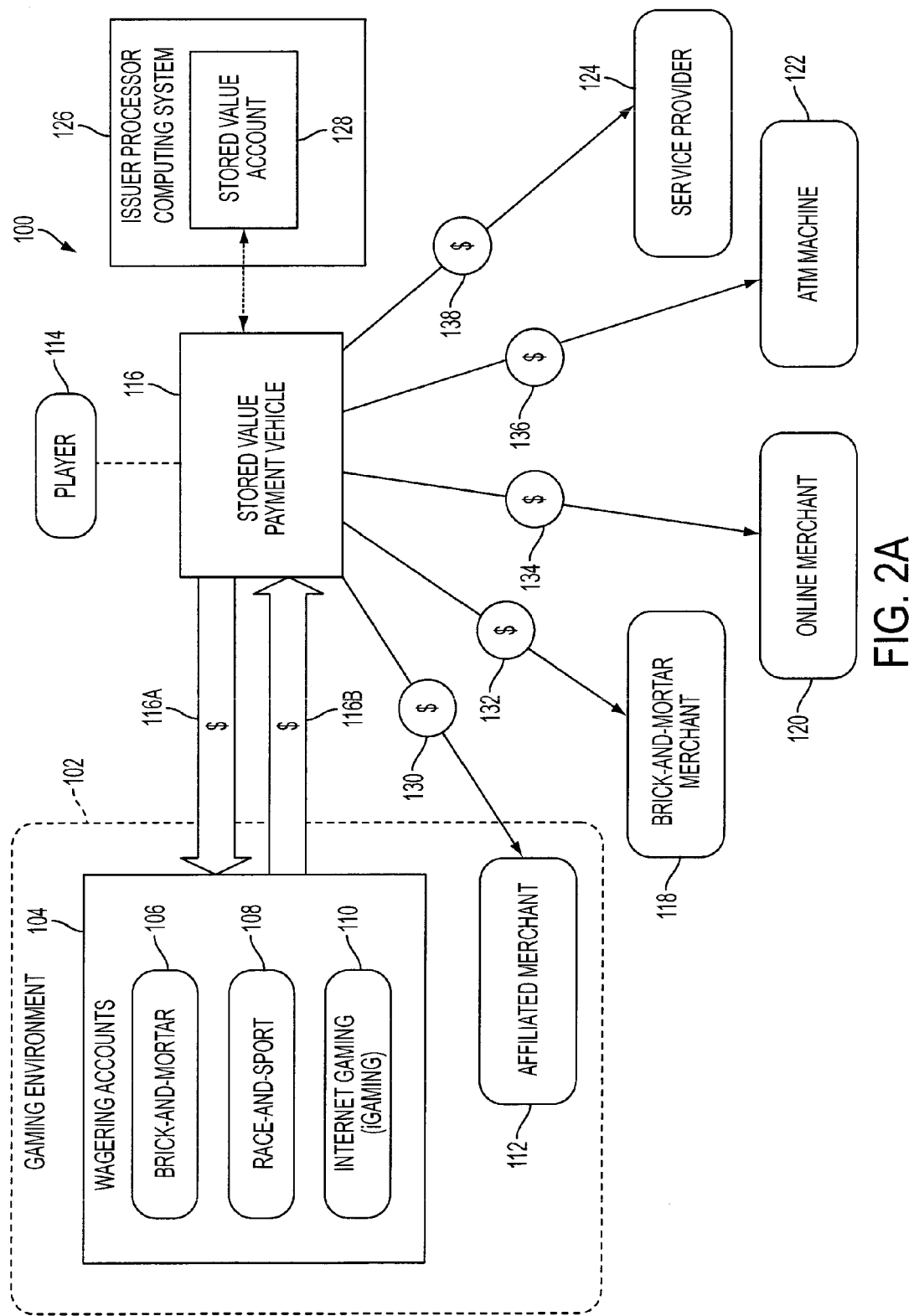
FIG. 2A depicts an example system view and flow process utilizing the stored value payment vehicle of FIG. 1 in accordance with one non-limiting embodiment.

In some cases, the gaming environment also extends to entities or services, such as third party computer systems generally controlled by or operated on behalf of a casino operator. FIG. 2A depicts an example system view and flow process 100 utilizing the stored value payment vehicle 116 in accordance with one non-limiting embodiment.

Referring now to FIGS. 1 and 2A, a player 114 can be issued the stored value payment vehicle 116 that is associated with a stored value account 128 maintained by an issuer processor computing system 126. The issuer processor computing system 126 can be a system used to maintain and/or process transactions associated with the stored value payment vehicle 116 and the stored value account 128. The stored value payment vehicle 116 can be a physical card, a virtual card, or any other suitable type of vehicle. In some embodiments, the stored value payment vehicle 116 is a general purpose reloadable card (sometimes referred to as a prepaid card). The stored value payment vehicle 116 can be an "open-loop card," which a consumer can use anywhere that accepts payment from a retail electronic payments network associated with the stored value payment vehicle, such as MASTERCARD, VISA, DISCOVER, and so forth, as discussed above. The stored value payment vehicle 116 can be a "closed-loop card", which a consumer can use at particular merchant locations, for example. The player 114 can fund (i.e., increase the available balance) the stored value account 128 through traditional techniques, such as by transfers funds from a demand access account (DDA) and/or funds loaded from a credit card to the stored value account 128 through an online interface. As described in more detail below, the player 114 can also selectively fund the stored value account 128 from the gaming environment 102 using cash, jackpot payouts, and numerous other ways, such as chip and slot ticket redemption.

In some embodiments, the player 114 can be issued the stored value payment vehicle through an application process. The application process can be facilitated through a gaming website or any other suitable type of online portal, computing system, automated teller machine, or kiosk. In accordance with the present disclosure, the stored value payment vehicle 116 issued as a result of the application can be branded or unbranded (i.e., generic). A branded stored value payment vehicle 116 can be affiliated with a particular casino or gaming environment or affiliated with any other third party brand. Branded stored value payment vehicles 116 may be generated when a player 114 completes the application process through a casino-branded gaming website or any other type of gaming website, for example. In some embodiments, the funds linked to the branded stored value payment vehicle 116 are restricted such that they can only be transferred to wagering accounts at particular gaming websites or properties, but not usable at other gaming websites or properties. The branded stored value payment vehicle 116 would still be usable at other types of non-gaming merchants as a traditionally open loop card. In this fashion, a particular casino can issue casino-branded stored value payment vehicles 116 that allow players to transfer balances to various gaming accounts associated with that casino, while restricting the player from transferring funds to gaming accounts associated with a competing casino. The transaction facilitator, as described in more detail below, can regulate the transfer of funds from particular stored value accounts to particular gaming accounts, in accordance with the brand associated with the stored value account.

By comparison, a player may complete the application process through a website or portal that is not affiliated with a particular casino or brand such that an unbranded stored value payment vehicle 116 is issued. In such cases, a player could freely transfer the funds tied to the unbranded stored value payment vehicle 116 to any number of gaming accounts in an unrestricted fashion. When branded as a third party brand, for gaming purposes, the stored value payment vehicle 116 may be usable, for example at brick-and-mortar poker rooms of an operator which permits its usage, any tournaments hosted by that operator, or at any other location where the operator might allow the usage of the card, such as slot devices, table games, gaming websites, iGaming, and so forth.

While the application process can be completed remotely through a website or mobile application or portal, in some embodiments the application process can be provided to the player 114 at the physical gaming environment when the player is physically present at a gaming location, such as a casino, racing venue, or other physical gaming environment. For example, the application process can transpire at the casino cage, a casino poker room, a casino player club station, hotel lobby, a kiosk, a lottery center, or other suitable environment. Specifically referring to embodiments involving poker play, the application process can be part of a poker tournament registration process or a poker room registration process. In either context, the registration can be occurring through an online portal, such as at a virtual gaming site, or at a brick-and-mortar location, such as a poker room or a casino cage.

Once the stored value account 128 is formed as part of the application process, the player 114 can fund the stored value account 128 through various techniques known in the art. Such funding can be facilitated through the website or portal used by the player during the application process or other the suitable websites (i.e., banking websites). In some embodiments, as described below, the funds can be cash-based, or the funds can be transferred into the stored value account 128 from a demand deposit account of the player. Other types of funding can be used, such as ACH, wire transfers, and so forth. The issuer processor computing system 126 can make the funds that are loaded into the stored value account 128 available in real time, substantially real-time, or subject to a predetermined delay. In any event, once the application process is completed, a physical stored value payment vehicle 116 can be generated and provided to the player. Depending on the type of card, it can be branded to a particular gaming operator or casino, branded to any other third party brand, or can be considered a generic or unbranded card.

Once the stored value payment vehicle is issued and funded, the player can utilize the funds linked to the stored value payment vehicle to pay for various forms of poker play, such as, without limitation, for online or brick-and-mortar tournament play or for non-tournament poker play. With regard to non-tournament poker play, the player can utilize the funds linked to the stored value payment vehicle to buy poker chips for online or brick-and-mortar non-tournament poker play. As used herein, the funding of any type of poker play using the funds linked to a stored value payment vehicle, including brick-and-mortar poker room gameplay, online poker gameplay, tournament poker gameplay (both virtual and in-person tournaments), is referred to generally as "poker gameplay funding."

In some operational environments, the poker gameplay funding can include various additional fees or charges, such as service or transactional fees, that may be associated with the poker gameplay. Further, as described in more detail below, in some embodiments loyalty points or other loyalty-based credits (such as casino comps, rewards, coupons, among other credits), which are also linked to the player can be used to cover, or at least supplement, the poker gameplay funding. Funds linked to the stored value payment vehicle can also be used to purchase additional goods and services that may be associated with or tied to the poker gameplay, such as bundled packages, that are available for purchase at the time of the poker gameplay funding. Example bundled poker packages can include, for example a travel package that includes a hotel, travel arrangements and meal vouchers, along with the tournament buy-in fee or cash game buy-in.

Figure 2B:
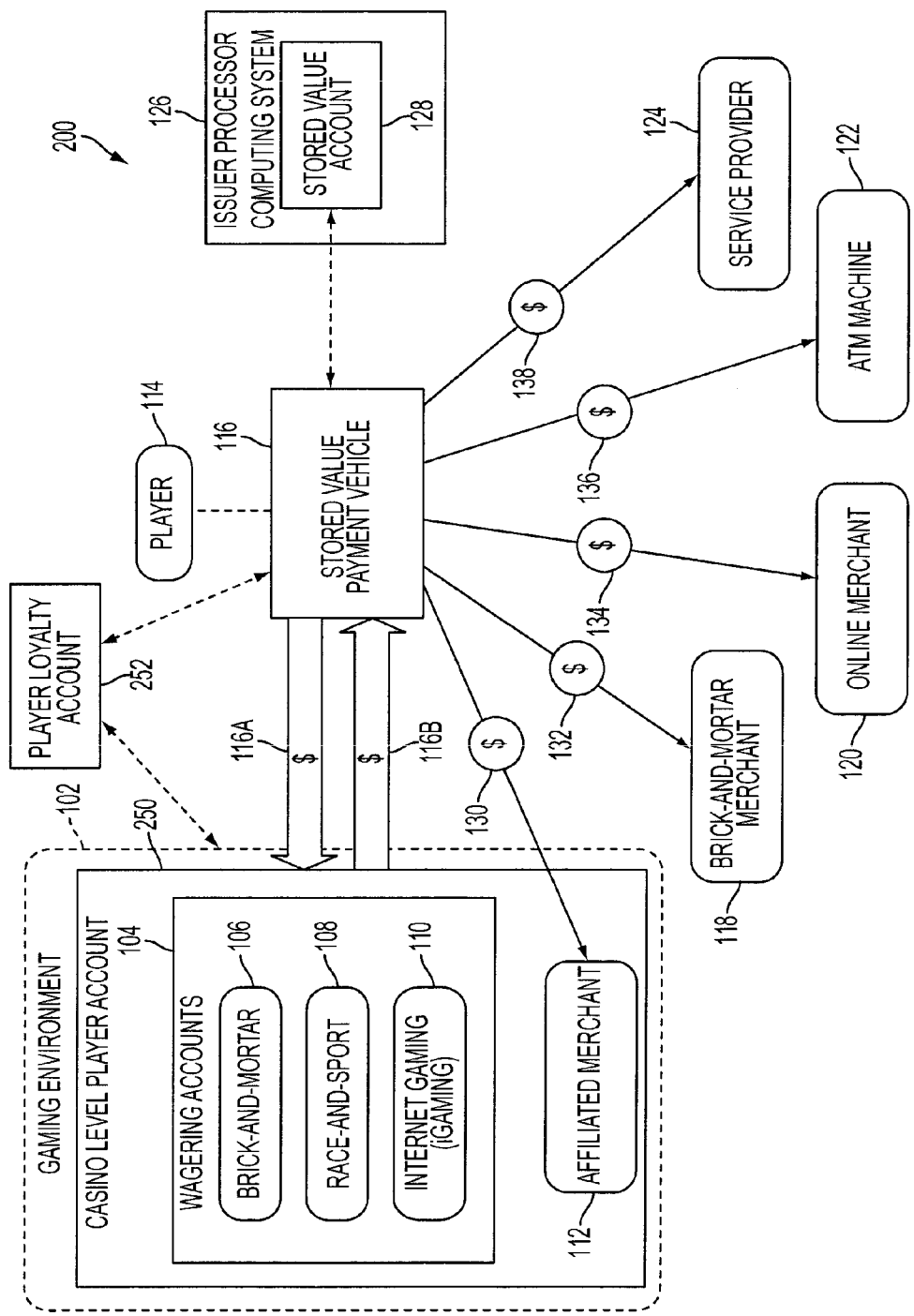
FIG. 2B depicts the system view and flow process of FIG. 2A further comprising a casino level player account in accordance with one non-limiting embodiment.

The stored value payment vehicle 116 can be used by the player 114 to make purchases at a variety of merchant types. As shown in FIG. 2B, non-limiting example types of merchants include a brick-and-mortar merchant 118, an online merchant 120, an ATM machine 122, and a service provider 124. Accordingly, the stored value payment vehicle 116 can be used to facilitate the transfer of funds from the stored value account 128 through purchase transactions (schematically illustrated as transactions 132, 134, 136, and 138). In some cases, a particular merchant may be associated with the gaming environment 102, such as affiliated merchant 112. Example affiliated merchants 112 can include, without limitation, on-property retailers, restaurants, and hotels. While the affiliated merchant 112 is illustrated as being within the gaming environment 102, this disclosure is not so limited. In some embodiments the affiliated merchant 112 is an online merchant, for example. The stored value payment vehicle 116 can be used for a purchase transaction 130 at such affiliated merchants 112. In some embodiments, the purchase transaction 130 can be processed as a closed-loop transaction due to the affiliation with the gaming environment or a transaction facilitator, as described below. As described in more detail below, the systems and methods described herein can allow for such a purchase transaction 130 by the player 114 to be incentive and/or rewarded. The purchase transactions 32, 134, 136, and 138 by the player 114 can also be rewarded, with reward levels being the same or different as the rewards or comps associated with purchase transaction 130.

A gaming account can be associated with the casino environment 102. As used herein, a gaming account can be any type of financial account (i.e., electronic ledger) that is associated with a player, or collection of financial accounts that are associated with a player, and maintained by a casino, or at least on behalf of a casino. While FIG. 1 schematically shows one gaming account 188 for the sake of clarity, it is to be appreciated that the player 114 and/or the stored value payment vehicle 116 can be associated with any number of gaming accounts 188. Further, the gaming account 188 can be any suitable account type. In FIG. 2A, for example, the gaming accounts associated with the play 114 are illustrated as wagering accounts 104. In other embodiments, such as described below in connection with FIG. 2B and FIG. 5, for example, the gaming account 188 can comprise a casino level player account. Still referring to FIG. 1, In accordance with the systems and methods described herein, the player 114 can selectively direct funds 116A associated with the stored value payment vehicle 116 to the gaming account 188. The player 114 can also selectively direct funds 116B associated with the gaming account 188 to the stored value payment vehicle 116. In other words, in accordance with the disclosure, the player 114 can transfer funds, back and forth, in real-time, between a stored value account 128 and the gaming account 188 of the player 114. In some embodiments, the directed funds 116A, 116B are transferred (i.e. credited) to the destination account in substantially real time. In other embodiments, a "pause" between an initiated transfer and an availability of the transferred funds can be implemented. For example, to the extent that regulators and responsible gaming advocates believe that a "pause" is significant to minimize reckless gaming, the systems and methods described herein are adaptable to institute certain pauses in accessing funds.

In one example embodiment, using directed funds 116A, 116B, a player 114 can supply funds for a gaming experience within the gaming environment 102, and subsequently cash-out from the gaming experience, all without physically handling cash or coins within the gaming environment 102. Since all of the funds are electronically transferred between a selected gaming account 188 and the stored value account 128 as credits and debits, for these particular transactions, the necessity for the player 102 or the gaming environment 102 to physically handle cash or coins is eliminated.

In the context of gaming websites, a player can direct funds from the stored value account 128 to the gaming account 188 of the gaming website and then return some or all the funds to the stored value account 128 at a later point in time. As such, the player does not have to utilize methods to cash out of gaming websites that may be considered less convenient, such as ACH transfers, physical checks, or cash. Instead, upon the conclusion of gaming on the gaming website, the funds can be generally instantly available through the player's stored value payment vehicle. These fund transfer directions can be received from the player from any of a variety of sources, such as mobile applications, various types of websites, or from various kiosks or portals.

In the context of poker play, a player can direct funds from the stored value account 128 to the gaming account 188 of the poker provider and then return some or all the funds to the stored value account 128 at a later point in time. As such, the player does not have to utilize methods to cash out of poker environments that may be considered less convenient, such as ACH transfers, physical checks, or cash. Instead, upon the conclusion of the poker gameplay, the player's chips can be converted to funds that can be generally instantly available through the player's stored value payment vehicle.

In some embodiments, the player 114 can bring cash or coins into the gaming environment 102 and selectively transfer such funds to their stored value account 128, as described in more detail below (see FIGS. 9-10, for example). Additionally, in other embodiments, the player 114 withdraw cash from their stored value account 128 while in the gaming environment, as described in more detail below (see FIG. 13, for example).

Referring again to FIG. 2A, gaming accounts associated with the player 114 are shown as wagering accounts 104, which can be managed by management computing system (not shown) affiliated with the gaming environment 102. In the illustrated embodiment, the wagering accounts 104 include a brick-and-mortar wagering account 106, a race-and-sport wagering account 108, and an iGaming wagering account 110 (i.e. associated with a gaming website). The brick-and-mortar wagering account 106 is generally an electronic ledger associated with a player's table and slot wagers and can be associated with a player's poker gameplay. The race-and-sport wagering account 108 is generally an electronic ledger associated with a player's sports and non-pari-mutuel race wagers. The iGaming wagering account 110 is generally an electronic ledger associated with a player's online wagers, such as online poker and virtual gaming. It is noted that in some jurisdictions, gaming regulations forbid the transferring of a player's funds stored in one wagering account 106, 108, 110 directly to another wagering account 106, 108, 110.

With regard to iGaming wagering accounts, once the movement of funds instructions are received and authenticated by the issuer processor computing system 126, the funds can be credited at the Gaming Site and debited from the stored value account 128. As described herein, such crediting and debiting can occur in real-time, substantially real-time, or subsequent to a delay. In some embodiments, the issuer processor computing system 126 sends a message to the gaming site that the funds requested by the patron are available, similar to an authorization message.

FIG. 2B depicts another embodiment of the system view and flow process 100 illustrated in FIG. 2A. As shown in FIG. 2B, the system view and flow process 200 additionally comprises a gaming account that is a casino level player account 250. The casino level player account 250 can be generally an electronic ledger associated with a player. It can also be associated one or more wagering accounts 104. The casino level player account 250 can offer a variety of functionality to the player 114. For example, a player 114 can direct funds stored their stored value account 128 to the casino level player account 250. In certain embodiments, the player 114 can direct funds stored in one of the wagering accounts 104 or other gaming account to the casino level player account 250, as opposed to directing the funds to the stored value account 128. The player 114 can then direct the funds held in the casino level player account 250 to a different wagering account 104. Additional details regarding example transfers of funds are described below in connection with FIG. 5. In some embodiments, the player 114 can selectively utilize funds held by the casino level player account 250 for closed-loop point of sale transactions, either retail transactions (such as at an affiliated merchant 112) or closed-loop cash outs, all while enjoying reduced interchange fees due to the closed-loop nature of the transactions. Therefore, in some cases, performing transactions with funds in the casino level player account 250 is less costly to the gaming operator of the casino environment 102 and to the player 114. For some implementations comprising a casino level player account 250, when a player 114 directs funds 116A into the gaming environment 102, the player 116 can still direct them to a particular wagering account 104, as illustrated. In other implementations comprising a casino level player account 250, a player 114 can direct funds 116A into the casino level player account 250. The player 114 can subsequently direct those funds to a particular wagering account 104 or use the funds for closed-loop transactions.

Figure 3:
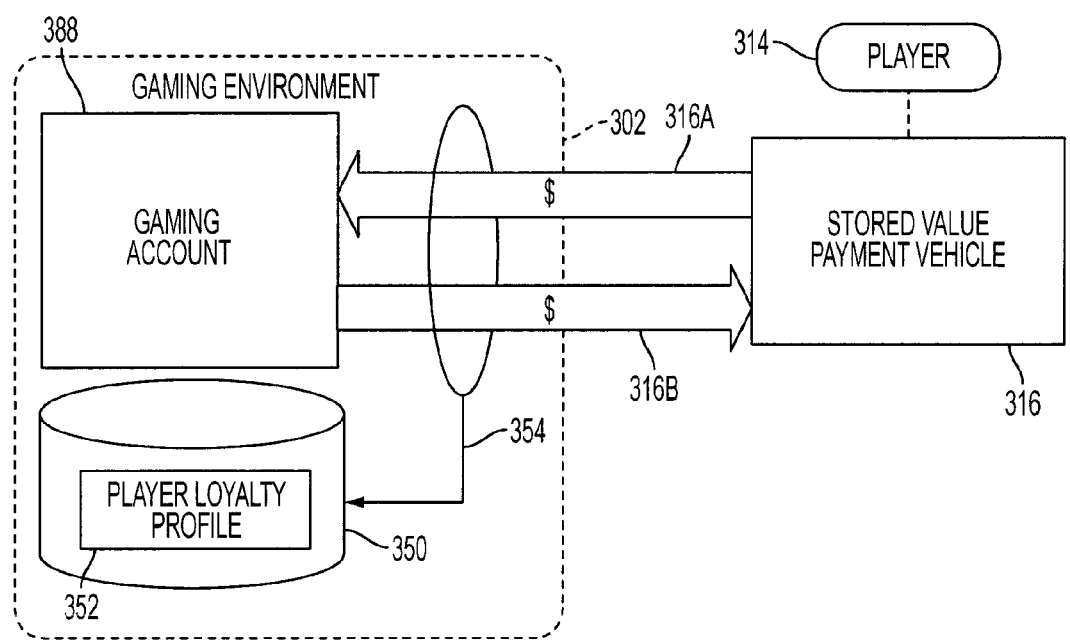
FIGS. 3-4 are diagrammatic representations of associations between stored value payment vehicles and gaming accounts in accordance with various non-limiting embodiments.

FIG. 3 is a diagrammatic representation of an association between a stored value payment vehicle 316 and a gaming account 388 in accordance with one non-limiting embodiment. Similar to FIGS. 1, 2A and 2B, the stored value payment vehicle 316 is issued to a player 314, and in accordance with the systems and methods described herein, the player 314 can selectively direct the transfer of funds 316A into a gaming account 388 of a casino environment 302. The player 314 can also direct the transfer of funds 316B from the gaming account 388. As is to be appreciated, the gaming account 388 illustrated in FIG. 3 can be, without limitation, a wagering account, a casino level player account, or a combination thereof. The stored value payment vehicle 316 is linked to a stored value account (not shown).

In this embodiment, the gaming environment 302 is linked to a player loyalty database 350 which stores data in the form of a player loyalty profile 352 associated with the player 314. The player loyalty profile 352 can include data associated with the gaming history of the player 314, incentives, comps, and other tracking-related information, as is known in the art. The loyalty profile 352 can also include information related to fund transfer data, as illustrated by data capturing 354. Accordingly, the player loyalty profile 352 can include, for example, dates of transfers, amounts of transfers, times of transfers, number of transfers, and so forth.

Figure 4:
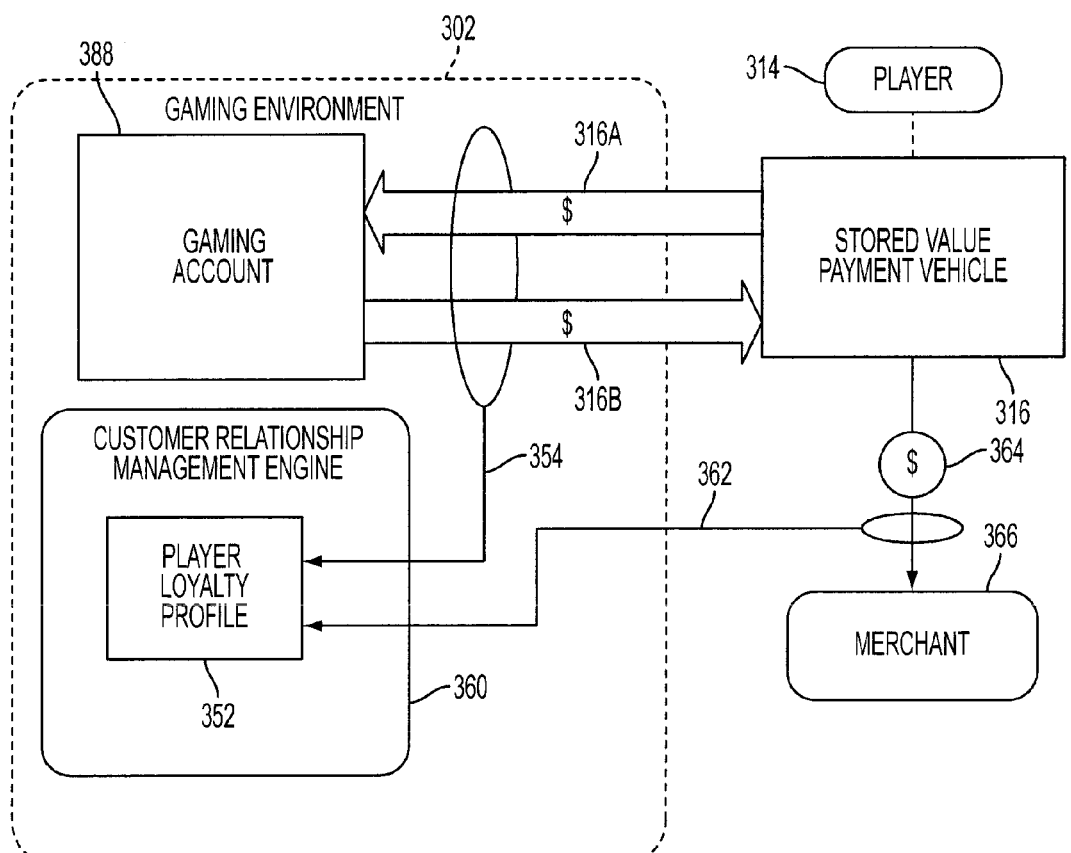

FIG. 4 is similar to the diagrammatic representation of an association between a stored value payment vehicle 316 and a gaming account 388 shown in FIG. 3, although FIG. 4 schematically illustrates additional functionality with regard to player tracking. In this embodiment, a financial transaction 364 in which the stored value payment vehicle 316 is used at a merchant 366 is shown. The merchant 366 can be, for example, any type of merchant or ATM that accepts the stored value payment vehicle 316 as a form of payment. As illustrated by data capture 362, information regarding the financial transaction 364 is provided to the player loyalty profile 352 utilizing data capture 362. In this embodiment, the player loyalty profile 352 is maintained by a customer relationship management engine 360, which can be operated by the gaming operator of the gaming environment 302 or a third party service provider. As described in more detail below, based on the player loyalty profile 352 and/or financial transactions 364, an operator of the gaming environment 302, or other parties or entities, can offer various incentives, discounts, coupons, deals, programs, or offerings to the player 314. Such offerings can be provided to the player 314 through a loyalty account associated with the player loyalty profile 352 and/or provided through the stored value payment account.

Figure 5:
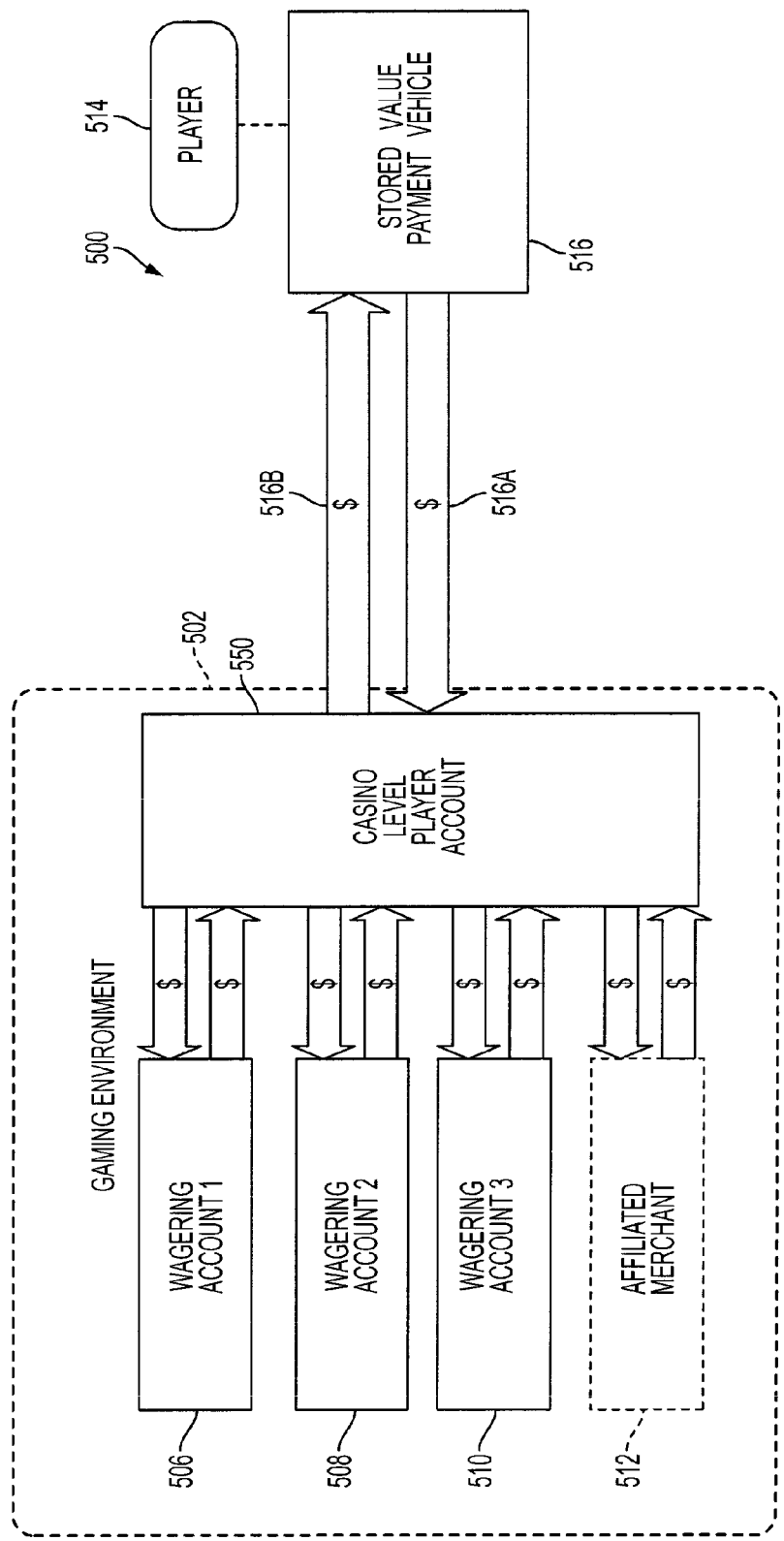
FIG. 5 schematically illustrates example cash flows between example gaming accounts associated with a player and cash flows between the gaming accounts and stored value payment vehicle issued to the player in accordance with one non-limiting embodiment.

FIG. 5 schematically illustrates example cash flows between example gaming accounts associated with a player 514 along with the cash flows between the gaming accounts and stored value payment vehicle 516 issued to the player. In the illustrated embodiments, the gaming accounts in the casino environment 502 are shown as a casino level player account a plurality of wagering accounts. In accordance with the systems and methods described herein, the player 514 can selectively direct the transfer of funds 516A into a casino level player account 550. The player 514 can also direct the transfer of funds 516B from the casino level player account 550. As is to be appreciated, the stored value payment vehicle 516 is linked to a stored value account (not shown). For funds held by the casino level player account 550, the player 514 can selectively transfer a portion (or all) of the funds in and out of various wagering accounts 506, 508, 510, shown as wagering account 1, wagering account 2 and wagering account 3. The player 514 can also utilize the casino level player account 550 to initiate financial transactions at an affiliated merchant 512 as a closed-loop transaction. The affiliated merchant 512 can be, for example, a retailer on a casino property, an ATM, or other type of closed-loop merchant.

Figure 6:
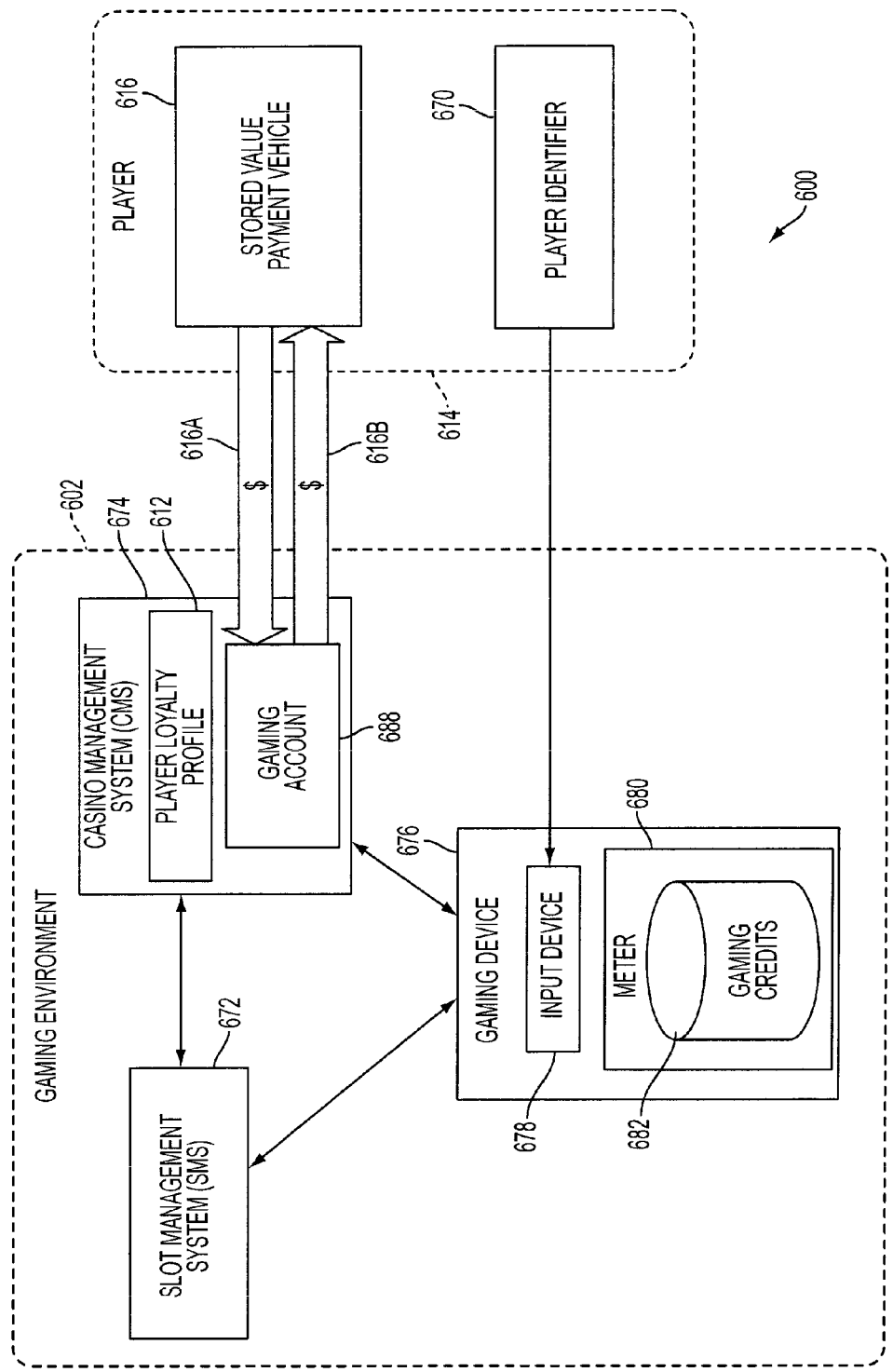
FIG. 6 is a diagrammatic representation of an example gaming system and flow process in accordance with one non-limiting embodiment.

FIG. 6 is a diagrammatic representation of another example gaming system and flow process 600 in accordance with one non-limiting embodiment. This gaming system and flow process 600 includes a networked gaming device 676, such as a slot machine, a casino kiosk, casino gaming pit computing system, sports book computing system, and so forth. As is generally known in the art, the gaming device 676 can be in networked communication with a variety of computer-based entities, such as a slot management system (SMS) 672 and a casino management system (CMS) 674. In some gaming environments, the SMS 672 and the CMS 674 may collectively be considered components of a casino computing system. The networked arrangement can include wired and/or wireless communication links. Examples of suitable networks can include a local area network (LAN), virtual private network (VPN), an Internet connection, and/or any other network configuration that is capable to enable the CMS 674 and SMS 672 to communicate with the gaming device 676 and other devices. The networked arrangement can provide two-way communications between the CMS 674 and SMS 672 and gaming device 676. In the illustrated embodiment, the CMS 674 maintains a player loyalty profile 612 for a player 614 and maintains gaming accounts for the player 614, shown as wagering account 614. Other embodiments however can use different configurations without departing from the scope of the present disclosure. For example, the player loyalty profile 612 may be maintained by a third-party customer relationship management service or the casino gaming system.

The gaming system can comprise one or more gaming accounts (shown as a single gaming account 688 in FIG. 6 for the sake of illustration). While the gaming account 688 is schematically shown within the CMS 674, other gaming environments can maintain the gaming account 688 elsewhere, such as by a separate wagering account management entity or a third-party wagering account provider. In the illustrated embodiment, the gaming account comprises a brick-and-mortar gaming account, so that gaming credits can be provided to the meter 680 of the gaming device 676, as described below.

A stored value payment vehicle 616, such as a prepaid debit card, or other suitable type of payment vehicle, is issued to the player 614 by a bank or other financial entity. A player identifier 670 is also assigned to the player 614 so that an operator of the gaming environment 602 can properly identify the player 614. In some embodiment, the player identifier 670 is expressed as a number or string that is provided to the player 614 on a physical card (such as a loyalty card or player's card). In other embodiments, the player identifier 670 can be graphical-based or be chip-based and utilize near-field communication (NFC) protocols, for example. In any event, as illustrated in FIG. 6, the player identifier 670 is provided to an input device 678 of the gaming device 676. As is to be appreciated, the particular type of input device 678 used to read the player identifier 670 will depend on the particular format of the player identifier 670. In some embodiments, the input device 678 is a magnetic card reader, while in other embodiments the input device 678 is an optical scanner. In some embodiments, in addition to providing the player identifier 670, additional credentials (such as a PIN) must be provided by the player 614 for authentication purposes. Further, while not illustrated, it is noted that in some embodiments, the gaming device 676 can be configured to read or scan the stored value payment vehicle 616.

Upon receiving the player identifier 670, along with any other credentials, the gaming device 676 provides the data to the SMS 672 and/or the CMS 674 through network communications. Upon authenticating the identification of the player 614, various types of financial transactions related to the stored value payment vehicle 616 and/or the gaming account 688 can be offered to the player 614. In some embodiments, such offerings are provided on a graphical display on the gaming device, as provided to the gaming device 676 by communications from the SMS 672 and/or CMS 674. In one embodiment, for example, an available balance in a stored value account associated with the stored value payment vehicle 616 is displayed to the player 614. Additional details regarding the retrieval of the available balance using a transaction facilitator is described in more detail below with regard to FIG. 7. The gaming device 676 can request a dollar amount be inputted by the player 614 and once the player 614 selects a dollar amount, a transfer of funds 616A can be initiated to direct funds associated with the stored value payment vehicle 616 to the gaming account 688. Depending on the type of gaming account 688 associated with the player, the funds can be transferred directly into a wagering account associated with the gaming device 676. Alternatively, funds can be received in a casino level player account and subsequently transferred to a wagering account associated with the gaming device 676. In any event, upon receipt of the funds 616A, the funds can be converted to gaming credits. The gaming credits 682 can then be metered into gaming device 676 by its meter 680. The player can then use the gaming credits for wagering at the gaming device 676, as is known in the art.

At the conclusion of a gaming session, the player 614 may desire to transfer any gaming credits 682 to the stored value payment vehicle 616 in the form of funds. In one embodiment, when the player 614 initiates a "cash out" action at the gaming device 676, the gaming device 676 prompts the player 614 to select the "cash out" technique, such as printing a ticket for subsequent redemption or a transfer to the stored value account that is associated with the stored value payment vehicle 616. Should the player 614 choose the latter, the gaming credits 682 can be first transferred out of the gaming device 676 and into the gaming account 688, where it is converted to funds. Then a transfer of funds 616B is initiated using a closed-loop communications with the financial institution maintaining the stored value account to credit that account. As described in more detail below, a transaction facilitator (not shown) can be used to facilitate the transmission of such credit and debit messaging. From the perspective of the player 614, the gaming credits that had been associated with the gaming device 676 are converted to funds that are available for access by the player's stored value payment vehicle 616. Such conversion of gaming credits to available funds for access by the stored value payment vehicle 616 can be in substantially real-time.

Figure 7:
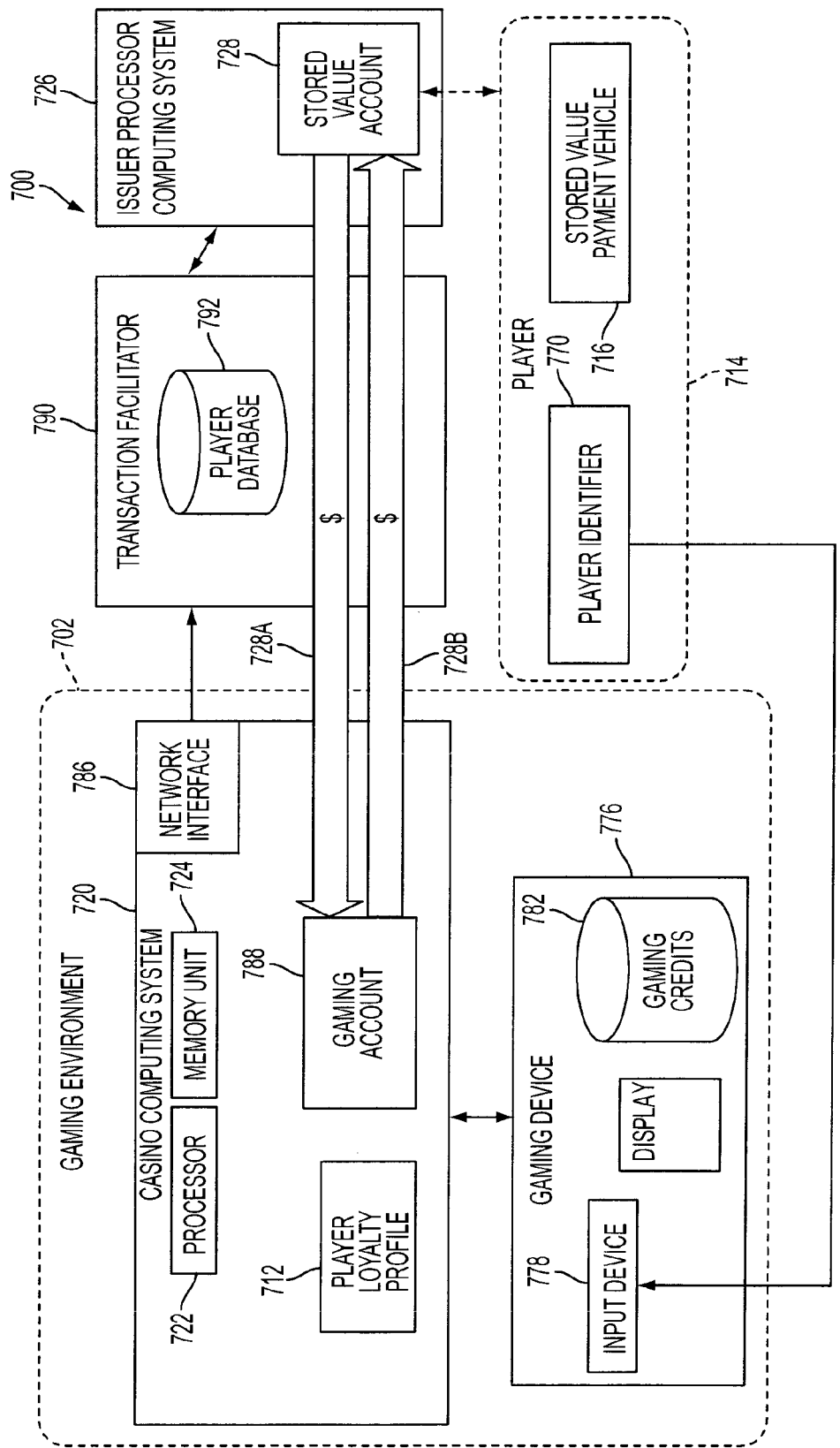
FIG. 7 is an example arrangement of a transaction facilitator interacting with a gaming environment and an issuer processor computing system in accordance with one non-limiting embodiment.

FIG. 7 is an example arrangement 700 of a transaction facilitator 790 interacting with both a gaming environment 702 and an issuer processor computing system 726, in accordance with one non-limiting embodiment. Generally, the transaction facilitator 790 receives financial transaction communications from the gaming environment 702. In some environments, such messages are received via a communications network, such as the SPAN™ network offered by Sightline Interactive LLC of Las Vegas, Nev. In some embodiments, the communications are received through an application programming interface (API) or other web-based messaging. The transaction facilitator 790 can also be in closed communication with the issuer processor computing system 726 that maintains the stored value account 728 associated with a stored value payment vehicle 716. It is noted that while the transaction facilitator 790 is schematically illustrated as a single entity, it is to be appreciated that this disclosure is not so limited. Instead, the functionality of the transaction facilitator 790, as described herein, can be distributed across, or otherwise performed by, a plurality of various entities, such payment gateways, acquirer processors, and other types of payment intermediaries. Also, the transaction facilitator 790, or at least components thereof, can reside within the gaming environment 702 or be controlled by an operator of the gaming environment. In such embodiment, the transaction facilitator 790 can be configured to communicate with the issuer processor computing system 726 through a secured communication link. Further, the transaction facilitator 790, or at least components thereof, can be controlled by the issuer processor computing system 726. Therefore, the transaction facilitator 790 may be operated by, or otherwise controlled by a variety of different entities. The transaction facilitator 790 can also have a one-to-one processing relationship with the gaming environment 702, as illustrated. It is to be appreciated, however, that the transaction facilitator 790 can also have a one-to-many configuration such that it has a processing relationship with a plurality of different gaming environments. The casino computing system 720, which can include one or more processors 722 and one or more computer memory units 724, can process the player identifier. For convenience, only one processor 722 and only one memory unit 724 are shown in FIG. 7. The processor 722 can execute software instructions stored on the memory unit 724. The processor 722 can be implemented as an integrated circuit (IC) having one or multiple cores. The memory unit 724 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example. In some embodiments, the casino computing system 720 can execute the slot management system and the casino management system described above.

Similar to input of the player identifier 670 described in FIG. 6, a player identifier 770 associated with the player 714 can be provided to the input device 778 of a gaming device 776. The gaming device can have one or more displays 784. The player identifier 712 can be used to identify a player loyalty profile 712 of the player. The casino computing system 720 can be configured to transmit the player identifier 770, or other player identifying data, to the transaction facilitator 790 using a suitable network interface 786.

Upon receiving the player identifier 770, or other player identifying data, the transaction facilitator 790 can match the player identifying data to a particular stored value account 728, as can be maintained by a player database 792. While the player database 792 is illustrated as a component of the transaction facilitator 792, this disclosure is not so limited. Such information can be stored by any suitable entity in the system hierarchy, including by an entity within the gaming environment 702. It is noted, however, that by maintaining the player database 792 outside the gaming environment 702, Payment Card Industry (PCI) compliance requirements of the gaming environment 702 may be reduced.

Once the stored value account 728 of the player 714 has been identified by the transaction facilitator 790, the transaction facilitator 790 can transmit the appropriate messaging to the issuer processor computing system 726. For example, messages may include a balance inquiry, an authorization request, and so forth. For fund transfers, the transaction facilitator 790 can facilitate the message flow to affect the transfers of funds 728A by debiting the stored value account 728 and crediting the gaming account 788 or the message flow to affect the transfers of funds 728B by debiting the gaming account 788 and crediting the stored value account 728. As described above, funds transferred into the gaming account 788 can be converted to gaming credits 782 for gaming at the gaming device 776. Alternatively, depending on the type of the gaming account 788, the funds can be used for other types of gaming, such as iGaming, race-and-sports gaming, and so forth.

Figure 7A:
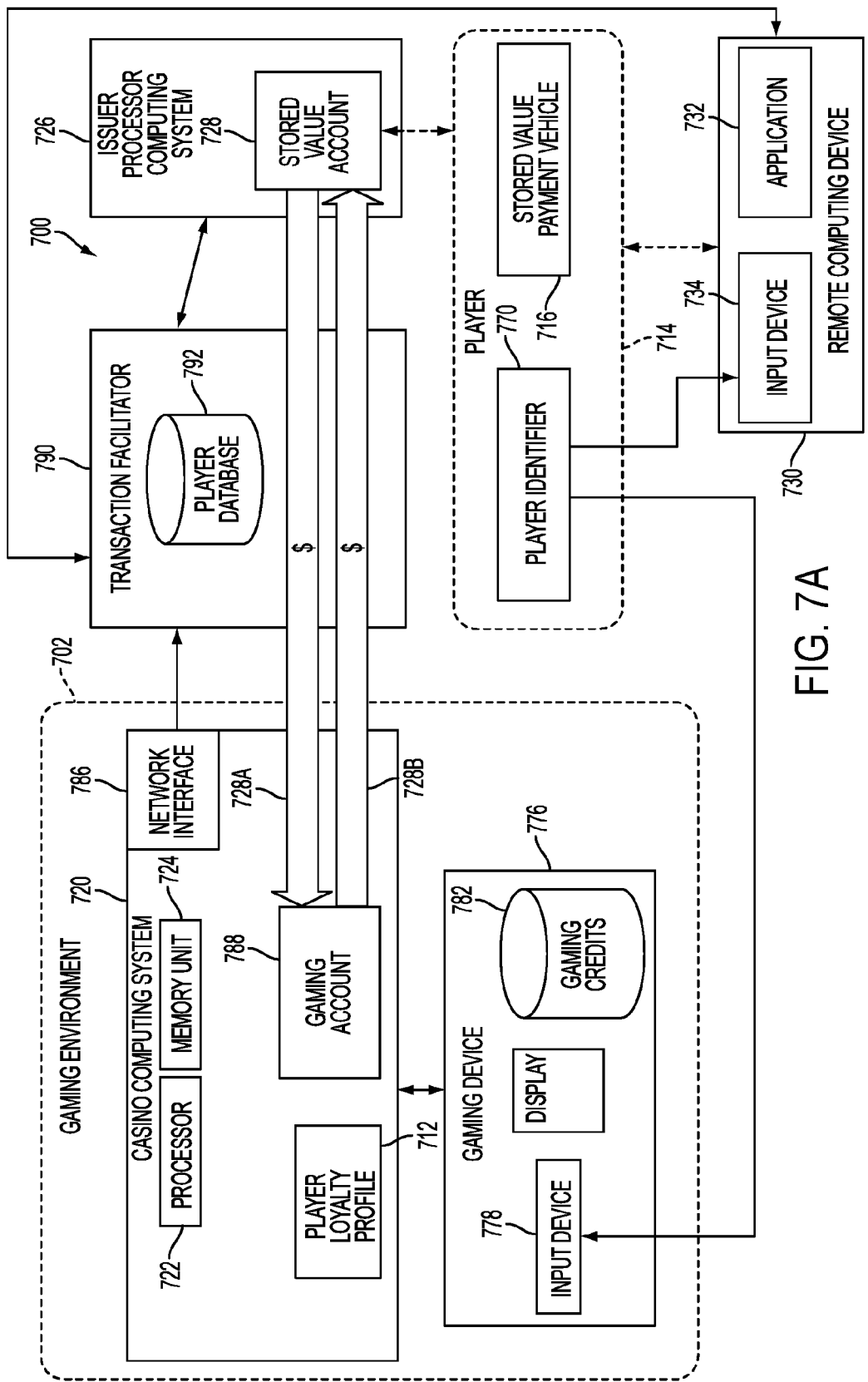
FIG. 7A depicts an example system diagram that includes a computing device executing an application for facilitating balance transfers.

In some embodiments, additionally or alternatively to the player 714 initiating balance transfers through interactions with the gaming device 776, the player 714 can interact with an application executing on a computing device to initiate various balance transfers. Through these interactions the player 714 can, for example, cause the transfer of funds stored by the stored value account 728 to the gaming account 788 and vice versa. FIG. 7A depicts an example system diagram that includes a remote computing device 730 executing an application 732 for facilitating such balance transfers. The remote computing device 730 can be any suitable networked computing device, such as, without limitation, a smart phone, a tablet computer, a desktop computer, a laptop computer, a gaming device, a wearable computing device, a kiosk, an ATM, and so forth. The remote computing device 730 can execute an application 732 that generally facilitates the transferring of balances at the player's direction to any number of gaming accounts 788. The application 732 can be a web browser or specialized software that is installed on, or otherwise accessible by, the remote computing device 730. The application 732 can provide one or more interfaces that allow for the player 714 to direct balance transfers between various accounts, such as the stored value account 728 and the gaming account 788. The application 732 can be, for example, a fund management application that provides the player 714 was various funds-related functionality. Additionally or alternatively, the application 732 can be a component of a gaming website, as described above. In some embodiments, the application 732 can provide instructions to the transaction facilitator 790, which in turn, provides the necessary calls to the issuer processor computing system 726 and casino computing system 720 to provide the transfers of balances, as schematically illustrated at 728A and 728B. If the stored value payment vehicle 716 is a branded stored value payment vehicle, as described above, the transaction facilitator 790 can check to see that the funds from the stored value account 728 are being transferred to a gaming account 788 that is approved (i.e., part of the brand). For example, if the stored value payment vehicle 716 is branded with Casino X and the player 714 is attempting to transfer funds to a gaming account associated with a gaming website of Casino Y, the transaction facilitator 790 can restrict the transfer. Similarly, if the stored value payment vehicle 716 is branded with a third party brand and the player 714 is attempting to transfer funds to a gaming account that is not associated with an approved gaming operator, the transaction facilitator 790 can restrict the transfer. By comparison, if the stored value payment vehicle 716 is unbranded or otherwise unrestricted, the player 714 can transfer funds from the stored value account 728 to any number of different gaming account 788, irrespective of brand association. Any such transfer restrictions can be assigned to the card at the time of issuance and stored by the transaction facilitator 790.

In addition to certain branded stored value payment vehicles having balance transfer restrictions, in some embodiments, unbranded stored value payment vehicles can also be subject to balance transfer restrictions. With regard to unbranded stored value payment vehicles, the restrictions can limit the gaming websites the unbranded stored value payment vehicle can be used to fund. For example, the transaction facilitator 790 can have agreements with certain gaming websites (i.e., approved gaming websites) and not have agreements with other gaming websites (i.e., unapproved gaming websites). When a player requests to move funds from the stored value account 728 to the gaming account 788 of a gaming website using one of the funding techniques described herein, the transaction facilitator 790 can check to see if the gaming website is an approved gaming website. If so, the balance transfer can proceed, otherwise the balance transfer will not be approved.

One non-limiting operational example will now be described for illustration purposes only. In this operational example, the player 714 is holding funds in the stored value account 728 that are accessible by the stored value payment vehicle 716. While inside or outside the gaming environment 702, the player 714 executes the application 732 on the remote computing device 730. The application 732 can be, in accordance with one non-limiting example, a mobile application executing on a mobile device. Upon executing the application 732, the player 714 can be asked to supply various credentials or identifiers. In the illustrated embodiment, the player 714 is asked to supply their player identifier 770 using an input device 734. As is to be appreciated, the input device 734 can be any suitable device, such as a key pad or optical scanner, for example. The application 732 can then present one or more transfer options to the player 714 through a graphical user interface. The player 714 can than select the option related to transferring funds from the stored value account 728 to the gaming account 788. In some embodiments, an account balance of the stored value account 728 can be displayed by the application 732.

Using the input device 734, the player 714 can enter a balance that is to be transferred from the stored value account 728 to the gaming account 788. In some embodiments, the player 714 can be asked to enter additional credentials, such as a Personal Identification Number (PIN). The PIN can be the PIN associated with the player's loyalty account and/or the application 732, for example. The application 732 can then communicate such request to the transaction facilitator 790, which can then submit a withdraw request to the issuer processor computing system 726. Prior to submitting the withdraw request, the transaction facilitator 790 can match the player identifying data to a particular stored value account 728, as can be maintained by a player database 792, as described above. The requested balance of funds can then be transferred to the gaming account 788 from the stored value account 728. This transferred balance can be accessible to the player 714 for use at gaming devices associated with the gaming account 788. The balance can be accessible in generally real-time or, in some implementations, subsequent to the passage of a period of time. Furthermore, while FIG. 7A illustrates that the balance of a single gaming account 788 is increased in response to a user input via the remote computing device 730, such arrangement is merely shown for pedagogical purposes as the remote computing device 730 can be used to increase the number of a plurality of different gaming accounts 788. Furthermore, the gaming accounts 788 can be any type of gaming account, such as brick-and-mortar gaming account, a race-and-sport gaming account, and an iGaming gaming account, for example. In some embodiments, the remote computing device 730 can execute multiple applications 732 that are each affiliated with a separate gaming environment 702. In some embodiments, the application 732 can be usable to effectuate balance transfers to a plurality of gaming accounts across a plurality of gaming environments.

When the player 714 interacts with a gaming device, such as a gaming device 776, the player identifier 770 can be provided to the input device 778, as described above. Upon communicating with the casino computing system 720, the gaming device 776 can display the balance of the gaming account 788. The player 714 can then select an amount of that balance to be converted to gaming credits 782 for gameplay at the gaming device 776.

At the conclusion of gameplay, the gaming credits 782 can be returned to the gaming account 788, as described herein, to increase its balance. The player 714 can then utilize the application 732 to effectuate the transfer of some or all of that balance from the gaming account 788 to the stored value account 728. For example, the player 714 can execute the application 732 and select the appropriate option for transferring a balance from the gaming account 788 to the stored value account 728. Once transferred, the funds can be accessible by the player 714 through the use of the stored value payment vehicle 716.

Figure 7B:
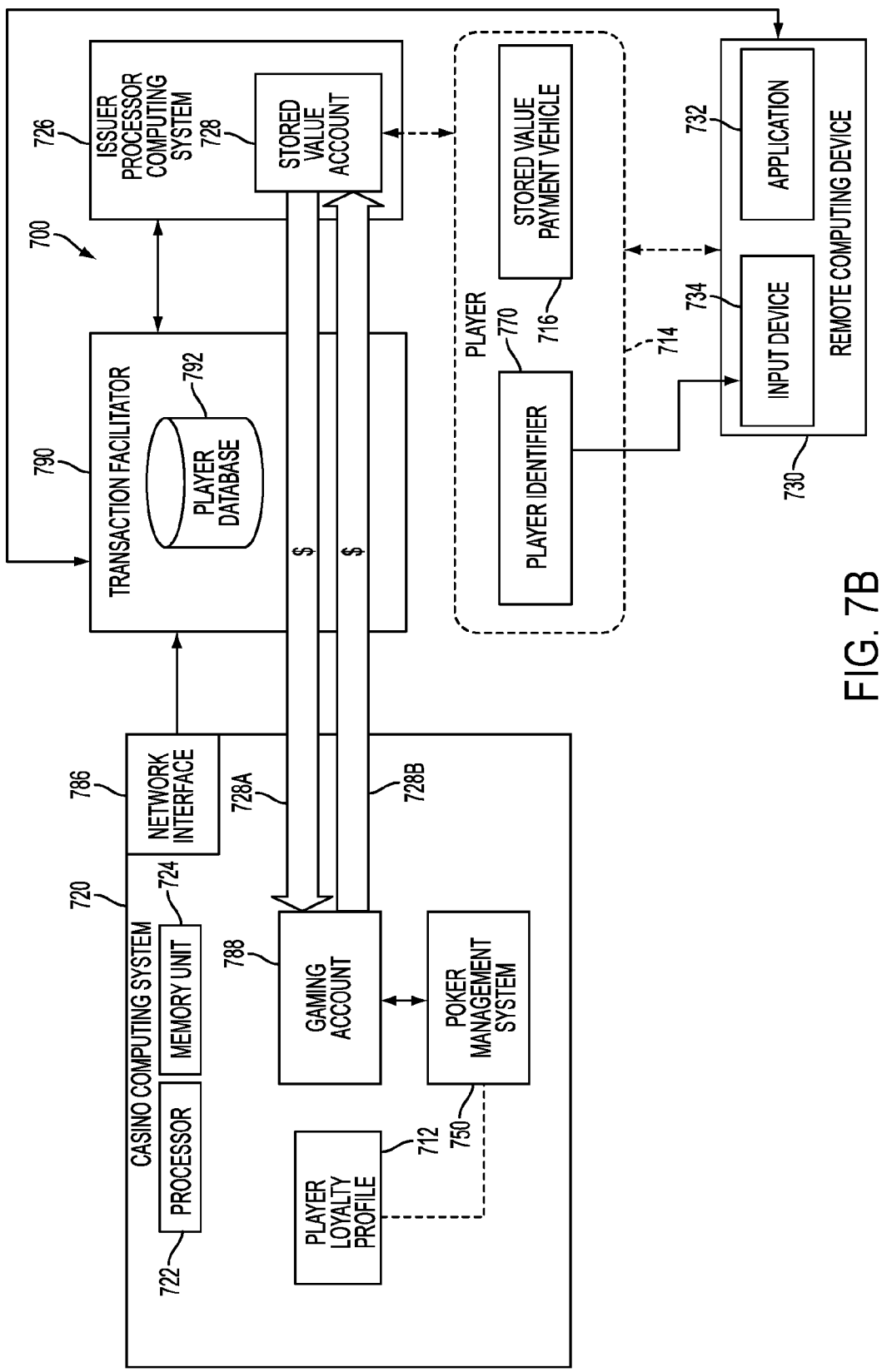
FIGS. 7B-7C depict example system diagrams for facilitating poker gameplay funding in accordance with various non-limiting embodiments.
Figure 7C:
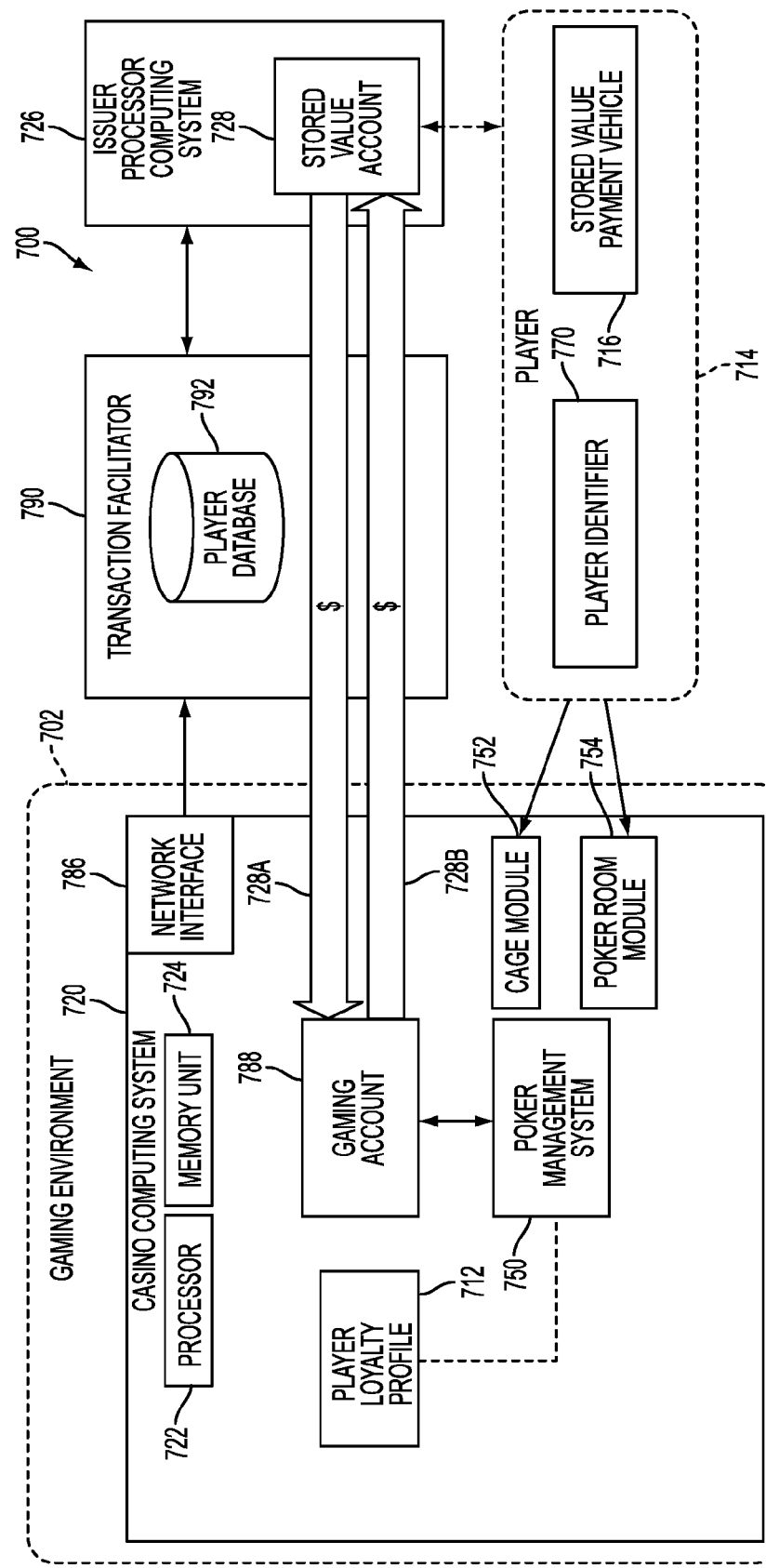

Referring now to FIGS. 7B-7C, in some embodiments, additionally or alternatively to the player 714 initiating balance transfers through interactions with the gaming device 776 (FIG. 7A), the player 714 can use any of a variety of techniques to transfer funds from the stored value account 728 for poker gameplay funding. In some embodiments, a poker management system 750 can be utilized by a gaming operator to facilitate poker operations. One example of a poker management system 750 is the BRAVO Poker System offered by Genesis Gaming Solutions, Inc. of Henderson, Nev. Other poker management systems 750 can be used. Generally, the poker management system 750 can manage a virtual or brick-and-mortar poker rooms through the monitoring and tracking of players, games, statistics, player history, dealer speeds, promotion tracking, tournament management, and so forth.

Referring first to FIG. 7B, an example embodiment is illustrated showing the player 714 utilizing the remote computing device 730 to initiate poker gameplay funding. Similar to the embodiment described above with reference to FIG. 7A, the player can interact with the remote computing device 730 to fund the stored value account 728 and then direct some or all of the funds into the gaming account 788. The remote computing device 730 can be any suitable networked computing device, such as, without limitation, a smart phone, a tablet computer, a desktop computer, a laptop computer, a gaming device, a wearable computing device, a kiosk, an ATM, and so forth. The poker management system 750 can then utilize those transferred funds for poker gameplay funding. The player 714 can use the funds held in the gaming account 788 to purchase poker chips, sometimes referred to as a cash buy-in. Additionally or alternatively, the player 714 can use the funds held in the gaming account 788 to pay for some or all of a poker tournament buy-in fee. At the conclusion of the poker gameplay, the player can convert any remaining poker chips to a balance in the gaming account 788 and then transfer that balance back to the stored value account 728, as indicated by the transfers of funds 728B.

Referring now to FIG. 7C, an example embodiment is illustrated showing the player 714 initiating poker gameplay funding through an assisted-service counter or kiosk, which can utilize a cage module 742 or a poker room module 754 to facilitate the funding. The player can interact, either directly or through an agent, with either the cage module 752 or the poker room module 754 to direct some or all of the funds from the stored value account 728 into the gaming account 788. In some embodiments, the player can first apply for and be issued the stored value payment vehicle through interactions with one of the game module 752 or the poker room module 754. In any event, once funds have been transferred into the gaming account 788, the poker management system 750 can then utilize those transferred funds for poker gameplay funding. Similar to the embodiment described above in FIG. 7B, the player 714 can use the funds held in the gaming account 788 to purchase poker chips. Additionally or alternatively, the player 714 can use the funds held in the gaming account 788 to pay for some or all of a poker tournament buy-in fee. At the conclusion of the poker gameplay, the player can convert any remaining poker chips to a balance in the gaming account 788 and then transfer that balance back to the stored value account 728, as indicated by the transfers of funds 728B.

Still referring to FIGS. 7B-7C, in some embodiments the stored value payment vehicle 716 can be branded, such that it is affiliated with a particular gaming operator for gaming purposes. In such cases, the branded card can be used at the brick-and-mortar poker rooms of that operator, tournaments hosted by that operator, or at any other location where the operator might allow the usage of the card, including at slot devices, table games, and iGaming. Similar to the processing described above with regard to FIG. 7A, if the stored value payment vehicle 716 is a branded stored value payment vehicle, the transaction facilitator 790 can check to see that the funds from the stored value account 728 are being used for poker gameplay that is approved (i.e., part of the brand). By way of example, if the stored value payment vehicle 716 is branded with Casino X and the player 714 is attempting to fund poker gameplay at the gaming website of Casino Y or use the funds for cash buy-in at Casino Z, the transaction facilitator 790 can restrict those transfers. Whereas if the player 714 attempts to fund poker gameplay at a property affiliated with Casino X (such as a website, mobile application, or brick-and-mortar casino), the transaction facilitator 790 can permit the transfer of funds. In some embodiments the stored value payment vehicle 716 can have a third party brand, such that for gaming purposes it is usable at the brick-and-mortar poker rooms of an operator(s) which permits its usage, any tournaments hosted by that operator(s), or at any other location where the operator(s) might allow the usage of the card, including at slot devices, table games, and iGaming.

In some embodiments, funds from additional payment vehicles, including credit cards, other stored value cards, debit cards, and the like can be used to supplement the poker gameplay funding. In this fashion, a first percentage of the gameplay funding can be from funds that were held by the stored value account 728 and a second percentage of the gameplay funding can be form funds from one or more other accounts. Some implementations can allow for loyalty points or credits earned by the player to be used for poker gameplay funding. Therefore, depending on an amount of points or credits the player has accrued and the lever of poker gameplay funding desired, the player can apply the points or credits to the poker gameplay funding. The points or credits can be accumulated based on any number of techniques, some of which are described herein.

The amount of funds utilized by the player 714 for the poker gameplay funding in accordance with the present disclosure can vary. Example funding amounts include, without limitation, a tournament buy-in value, a tournament buy-in value plus a service fee, a tournament buy-in value paid for by some type of loyalty points and/or waived in additional to a service fee that is paid for by some type of loyalty points and/or waived, a tournament buy-in value plus a travel package (such as an airline flight, a hotel room, meals vouchers, and so forth), a tournament buy-in value plus a service fee plus a travel package (might include an airline flight, a hotel room, meals, etc.), or a tournament buy-in value paid for by some type of loyalty points and/or waived plus a service fee paid for by some type of loyalty points and/or waived plus a bundled package. In some cases, the poker gameplay funding along with the travel package may be referred to as a bundled poker package. In some embodiments, a player may wish to split the gameplay funding transaction so that a tournament buy-in fee uses the funds from the stored value account 728 and additional fees or costs are paid for with additional payment sources.

For some embodiments utilizing loyalty points for poker gameplay funding, the poker management system can be in communication with the player loyalty profile 712. In other embodiments, the loyalty points are associated with the stored value payment vehicle 716 can be specific to one gaming operator, to multiple gaming operators' loyalty programs, to a third party loyalty program, or combinations therefor.

One deficiency of typical casino loyalty systems is that they cannot capture patron spending behavior that occurs in non-gaming environments, such as in casino related restaurants, hotel, retail stores, ATM, and so forth. Casino loyalty systems also do not capture spending behavior outside their physical property. Therefore, it may be desirable for casinos and other gaming environments to expand their customer's loyalty programs (i.e., point earning capability) to include related non-gaming activity. These expanded programs may encourage greater loyalty and patronage of the casino while also providing additional business intelligence regarding consumer behavior.

Figure 8:
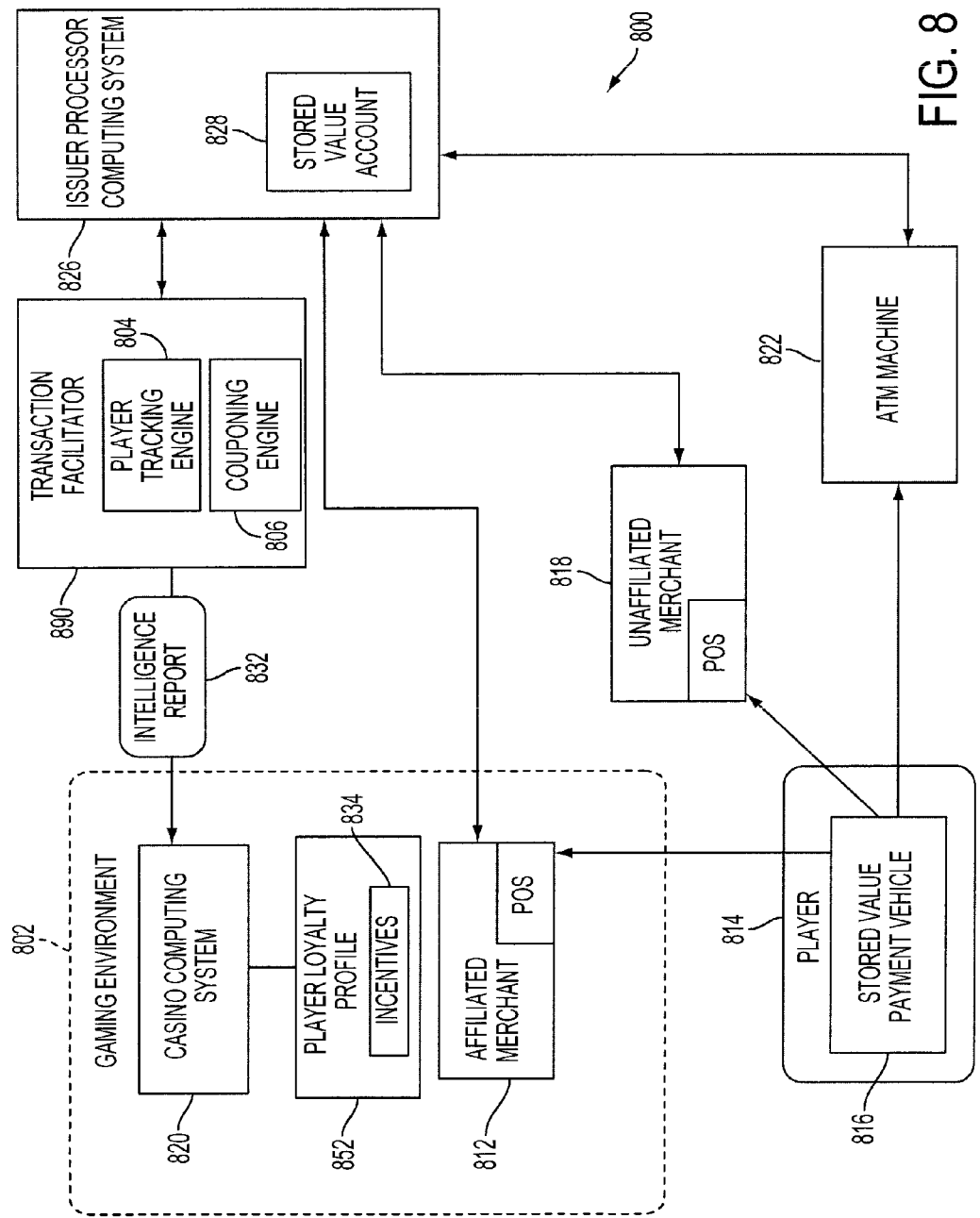
FIG. 8 is an example arrangement for tracking and rewarding player activity in accordance with one non-limiting embodiment.

FIG. 8 illustrates an aspect of the present disclosure that aims to capture patron spending behavior that occurs in non-gaming environments of a casino, such as in the restaurants, hotels, retail establishments, ATM's and well as spending behavior that occurs in non-casino environments, such as in the restaurants, hotels, retail establishments, ATM's. The spending behavior is captured and related to the consumer's loyalty program for processing. Capturing the behavior is possible because of a communication link that is established between a processor of the transactions based on a stored value payment vehicle and the casino loyalty program processor. In the illustrated embodiment, the player 814 is issued a stored value payment vehicle 816. The player 814 also has a player loyalty profile 852 that is maintained by a customer relationship management computing system. In accordance with the presently disclosed systems and methods, tracking information regarding the player's 814 use of the stored value payment vehicle 816 can be provided to improve the depth and value of player loyalty profile 852.

The stored value payment vehicle 816 can be used for financial transactions at a variety of locations, such as an unaffiliated merchant 818 or an ATM machine 822. These transactions can use traditional open-loop payment network communications to seek authorizations from the issuer processor computing system 826 associated with the stored value payment vehicle 816, as is known in the art. The stored value payment vehicle 816 can also be used at an affiliated merchant 812, such as at a casino hotel or restaurant. Depending on the acquirer processor used by the merchants 812, 818 the transaction may be routed to the issuer processor computing system 826 through either open-loop network communication links or closed-loop network communication links.

For both types of transactions, data regarding these transactions can be provided to the transaction facilitator 890. Upon receiving (or in some cases retrieving) transactional data, a player tracking engine 804 can determine a loyalty profile account associated with the cardholder. In some embodiments, the player tracking engine 804 utilizes a player database, which may be similar to the player database 792 shown in FIG. 7. The transaction facilitator 890 can then dispatch an intelligence report 832 to the casino computing system 820 or otherwise make the intelligence report 832 available to the casino computing system 820. The intelligence report 832 can be in a variety of different forms and include a wide variety of information. The intelligence report 832 can be, for example, data provided to a casino computing system and/or customer relationship platform. The intelligence report 832 can be provided using any suitable distribution technique and may vary based on implementation. For example, the intelligence report 832 can be provided as a data feed in some embodiments. In other embodiments, the intelligence report 832 can be provided as a data file or other type of file. In some embodiments, the intelligence report 832 includes identifications of the various merchants where the player 814 used, or attempted to use, the stored value payment vehicle 816.

In some embodiments, the player tracking engine 804 can be configured to assign a loyalty value, such as using a point system, or other metric, to various transactions involving the stored value payment vehicle 816, or the player based on the transactions of the stored value payment vehicle 816. Transactions at a first set of merchants, as identifiable by a merchant category code received from a POS device, may receive a higher point value or different value metric than transactions received from a second set of merchants. In the context of the illustrated embodiment, financial transactions at the affiliated merchant 812 can provide the player 814 with more loyalty "points" than financial transactions at the unaffiliated merchant 818. In some cases, the transaction at the unaffiliated merchant 818 may have zero loyalty value or even have a negative loyalty value. For example, the unaffiliated merchant 818 may be a merchant at a competing casino. Based on the incentivized behavior, the player 814 may decide not to use the stored value payment vehicle 816 at unaffiliated merchant 818 and instead use it at affiliated merchant 812.

The player tracking engine 804 can accumulate points or other loyalty data/values for the player 814 for a particular period and then provide a reporting of the points in the intelligence report 832. Based on the points values, or other metrics, incentives 834 can be provided to the player through the player loyalty program.

In accordance with certain embodiments, a couponing engine 806 can allow for the distribution of merchant-specific coupons as part of a loyalty program. The couponing engine 806 can store a table, for example, correlating the stored value payment vehicle 816 to particular discounts, coupons, or offers as part of a loyalty program (collectively referred to as coupons) at particular merchants, which may be both affiliated and unaffiliated. When an authorization request is received by the issuer processor computing system 826 from a POS device associated with a merchant (which may be an affiliated or unaffiliated merchant), the issuer processor computing system 826 can query the couponing engine 806 to see if a coupon or other offering is available.

By way of example, a player 814 may have a received a coupon from a casino for $10 off a meal at a specific restaurant. For this example, the player 814 has an available balance of $100 in their stored value account 828. The player 814 dines at the restaurant and charges $50 to their stored value payment vehicle 816. The POS device seeks authorization from the issuer processor computing system, as is known in the art. Upon receiving the authorization request, the issuer processor computing system 826 uses the couponing engine 806 to see if a coupon is available for use (in this case, based on the cardholder and the merchant). The $10 off a meal coupon is identified as being applicable. The issuer processor computing system 826 returns a message to the POS device at the restaurant authorizing the full $50 charge. The stored value account 828, however, is only debited $40, thereby taking the available balance to $60. Accordingly, a coupon was automatically applied to the open-loop transaction using the stored value payment vehicle 816 without needing the merchant to apply the coupon to the sale. Once the coupon is applied to a transaction, the player tracking engine 804 can report the redemption of the coupon in the intelligence report 832, or using other forms of reporting.

Players using the systems and methods described herein in a gaming environment may desire to load funds into their stored value account. It may be desirable to load such funds in substantially real-time so that the funds are accessible via their stored value payment vehicle relatively quickly. FIG. 9 schematically illustrates various techniques for a player 914 to load funds to a stored value account 900 that is associated with a stored value payment vehicle 916. The player 914 can utilize any number of fund sources 940, including player-sourced funds 942 and jackpot funds 944. Referring first to the player-sourced funds 942, a player can approach a computing system 920 of the casino environment with the funds 942. The computing system 920 may be, for example, an attended computing system (such as a casino cage) or an unattended computing system (such as at a kiosk). The type of computing system 920 will determine which type of funding module can be executed. For example, the cage module may allow for a player 914 to load both chips and cash into their stored value account 916. The cage module may also allow for the player 914 to load a jackpot 944 into their stored value account 916, which is described in more detail below with regard to FIG. 12. The kiosk module may only allow for a player 914 to load cash, coins, or tickets to their stored value account 916. A pit module, which can be executed on a computing system accessible by a dealer or a pit boss, can allow for the loading of a stored value account 916 using chips. A mobile module may be executing on a mobile computing device 920, such as a tablet computer, that can read tickets. In some embodiments, the mobile module can facilitate a player 914 transferring funds to/from the stored value account 916 to/from a gaming account (i.e., an iGaming wagering account). If the computing device 920 is part of a gaming device, the slot module can allow for the funding of the stored value account 916 through gaming credits (as described above).

The computing system 920 can communicate with a transaction facilitator 990 through network communications, as described above. The transaction facilitator 990 can be provided using any suitable processor-based device or system, such as a personal computer, laptop, server, mainframe, or a collection (e.g., network) of multiple computers, for example. The transaction facilitator 990 can include one or more processors 992 and one or more computer memory units 994. For convenience, only one processor 992 and only one memory unit 994 are shown in FIG. 9. The processor 992 can execute software instructions stored on the memory unit 994. The processor 992 can be implemented as an integrated circuit (IC) having one or multiple cores. The memory unit 994 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

In some embodiments, a server 996 can provide a graphical web user interface through which various users (such as players, casino operators, and so forth) can interact with the transaction facilitator 990. The server 996 can accept requests, such as HTTP requests, from clients (such as a web browser on the computing system 920), and serve the clients responses. In some embodiments, the server 996 can provide a user interface for users who do not communicate with the transaction facilitator 990 using a web browser. Such users can have special software installed on their computing system 920 that allows them to communicate with the transaction facilitator 990 via the network.

Figure 10:
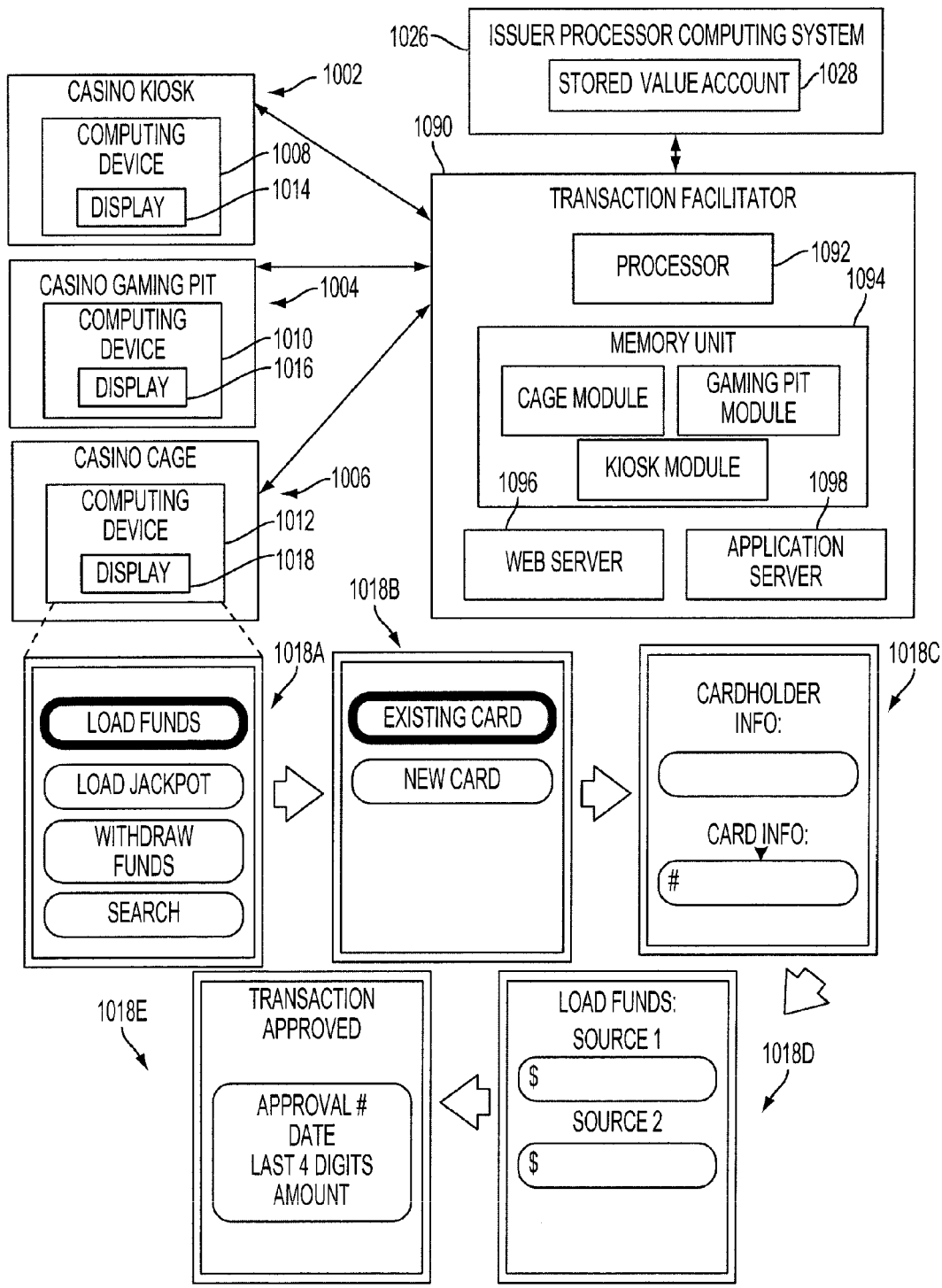
FIG. 10 is a diagrammatic representation of various computing devices associated with a casino that are in communication with a transaction facilitator that performs various financial transactions associated with a stored value account managed by an issuer processor computing system.
Figure 11:
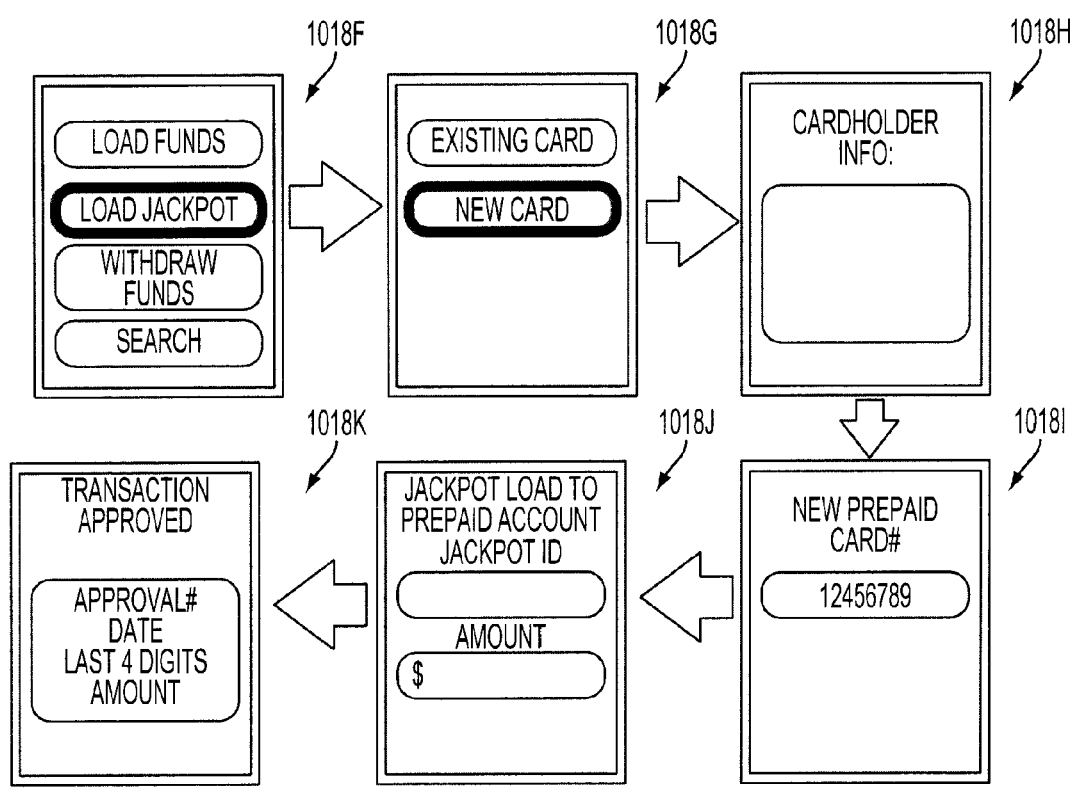
FIGS. 11-14 depict example simplified screen displays of the casino cage computing device of FIG. 10.

FIG. 10 is a diagrammatic representation of various computing devices associated with a casino that are in communication with a transaction facilitator 1090. The transaction facilitator 1090 is configured to performs various financial transactions associated with a stored value account 1029 managed by an issuer processor computing system 1026. In illustrated embodiment, computing devices 1008, 1010, 1012 are shown that are respectively associated with a casino kiosk 1002, a casino gaming pit 1004, and a casino pit 1006. Each computing device 1008, 1010, and 1012 also has a respective display 1014, 1016, and 1018. Content received from the transaction facilitator 1090 over the network can be presented on the displays 1014, 1016, and 1018.

Figure 9:
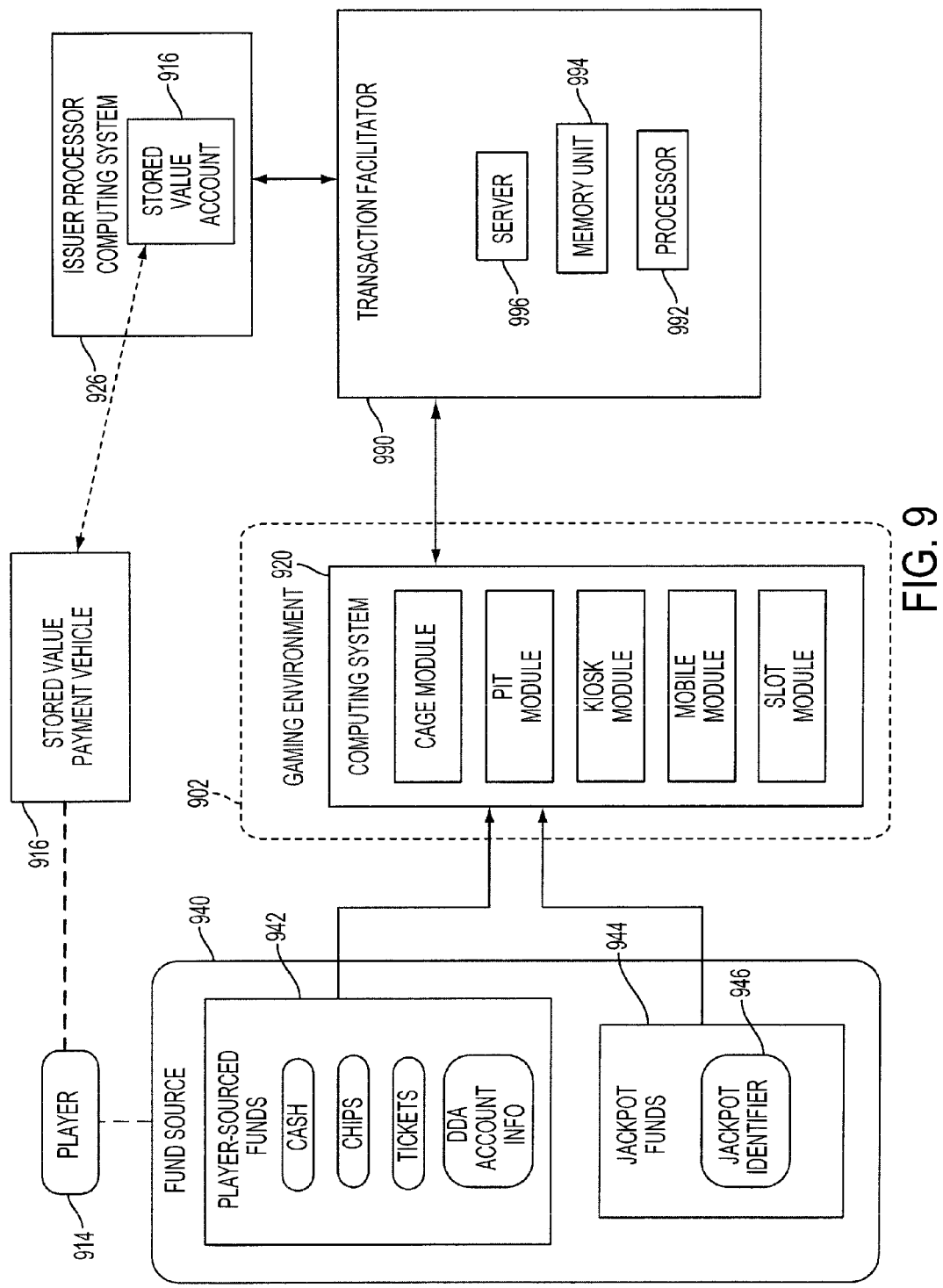
FIG. 9 schematically illustrates various techniques for a player to load funds to a stored value account.

Similar to the transaction facilitator 990 of FIG. 9, the transaction facilitator 1090 can include various computing components, such as a web server 1096, an application server 1098, a memory unit 1094, and a processor 1092. Computing devices contacting the transaction facilitator 1090 can each be assigned an identifier, such as a Device ID. Using the Device ID, the transaction facilitator 1090 can determine which module to execute based on permissions or functionality associated with that Device ID. In the illustrated embodiment, the transaction facilitator 1090 has a module for computing devices that are associated with casino kiosks, as well as a module for computing devices associated with a gaming pit and computing devices associated with the casino cage. As described above, the particular functionality offered at these different computing devices can differ.

Still referring to FIG. 10, example simplified screen displays 1018A-1018E of the computing device 1012 associated with the casino cage 1006 are shown. Referring first to home screen 1018A, a variety of options are displayed, including "load funds, "load jackpot," "withdraw funds," and "search." As illustrated, the "load funds" option has been selected. At screen 1018B, the user is prompted to identify if the funds will be loaded to an "existing" stored value payment vehicle or if a "new" stored value payment vehicle will need to be issued prior to loading. As illustrated, the "existing card" option has been selected. At screen 1018C player identification information is received, such as name, address, and so forth. Additionally the card information for the existing card is provided to the system. The stored value payment vehicle can be physically swiped, or otherwise read, by the computing device 1012 or the card information can be manually typed. Next, a screen 1018D is provided which optionally allows the operator to identify the particular type of funds that the player is providing. For example, source 1 can be "chips" and source 2 can be "cash." Other sources may be delineated on the screen as well. Itemizing the type of funds may be beneficial for internal auditing or tracking purposes. The funds are totaled to determine the total load amount and the computing device 1012 communicates a "load funds" message to the transaction facilitator 1090 for the amount of funds tendered by the player, less any processing fees. Upon successfully crediting the stored value account 1028, the transaction facilitator 1090 can provide an approval number and other transaction information for display on a transaction approval screen 1018E.

FIGS. 11-14 depict more example simplified screen displays of the computing device 1012 of FIG. 10. Referring first to screen 1018F of FIG. 11, the "load jackpot" option has been selected. Similar to screen 1018B, screen 1018G allows an operator to select whether the jackpot will be loaded to an existing card or a new card. In this embodiment, the "new card" option has been selected. The transaction facilitator 1090 then proceeds to gather personal information from the player needed to issue a stored value payment vehicle. At screen 1018H, for example, the player's name and address is entered. A card number is issued to the player, as shown by screen 1018I. In some embodiments, a non-personalized card is printed and provided to the player at the time of registration with a personalized card to be issued and mailed to the player at a later point in time. Once the player has a stored value card number that is linked to a stored value account, the player is asked at screen 1018I to provide a jackpot ID and jackpot amount. As is known in the art, jackpots payouts are tracked and are verified prior to payout. Therefore, upon receiving the jackpot ID, the computing system 1012 can query the appropriate casino computing systems to verify the validity of the jackpot. Once the jackpot has been validated, the computing device 1012 communicates a "load funds" message to the transaction facilitator 1090 for the amount of the jackpot payout, less any processing fees. Upon successfully crediting the stored value account 1028, the transaction facilitator 1090 can provide an approval number and other transaction information for display on a transaction approval screen 1018K.

Figure 12:
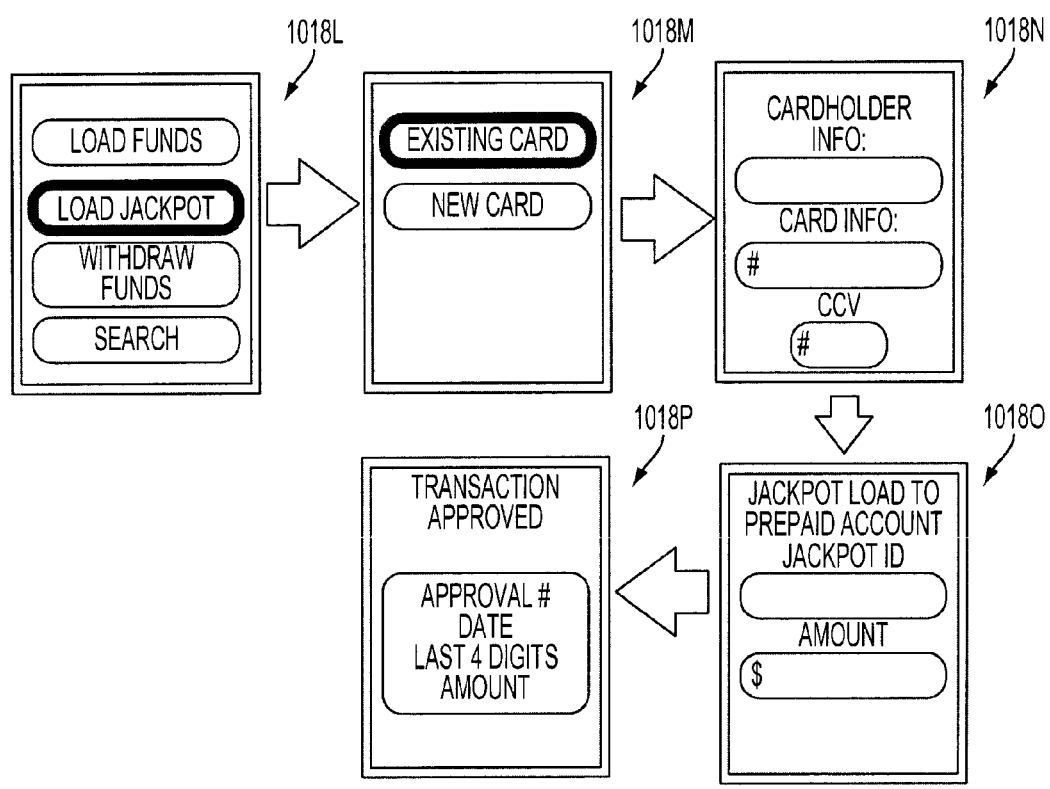

Referring now to screen 1018L of FIG. 12, the "load jackpot" option has been selected. Similar to screen 1018G, screen 1018M allows an operator to select whether the jackpot will be loaded to an existing card or a new card. In this embodiment, the "existing" option has been selected. At screen 1018N player identification information is received, such as name, address, and so forth. Additionally the card information for the existing card is provided to the system. The stored value payment vehicle can be physically swiped, or otherwise read, by the computing device 1012 or the card information can be manually typed. Now that the player has provided their stored value payment vehicle number that is linked to a stored value account, the player is asked at screen 1018O to provide a jackpot ID and jackpot amount. Once the jackpot has been validated, the computing device 1012 communicates a "load funds" message to the transaction facilitator 1090 for the amount of the jackpot payout, less any processing fees. Upon successfully crediting the stored value account 1028, the transaction facilitator 1090 can provide an approval number and other transaction information for display on a transaction approval screen 1018P.

Figure 13:
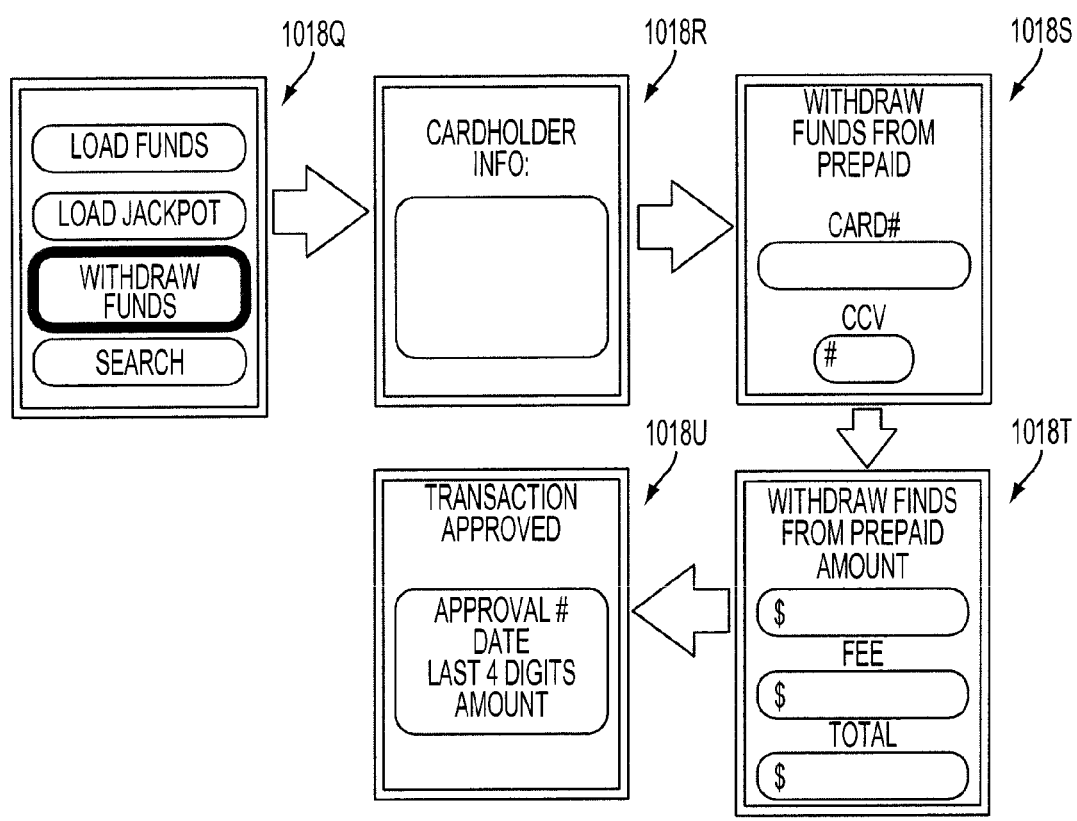

Referring now to screen 1018Q of FIG. 13, the "withdraw funds" option has been selected. Using this option, a player can access funds that are stored by the issuer processor computing system 1026 in the stored value account 1028. At screen 1018R cardholder information, such as name and address is received, and at screen 1018S the card number and other security-related data can be received. In some embodiments, the transaction facilitator 1090 can perform a balance check and report, via the computing device 1012, the amount of funds available for withdraw. At screen 1018T, the amount of funds, associated processing fee, and total amount is withdraw is itemized. The transaction facilitator 1090 then dispatches the appropriate messaging to the issuer processor computing system 1026 to debit the stored value account 1028 accordingly. Similar to other embodiments, a transaction approval screen 1018U can report data regarding the withdrawal.

Figure 14:
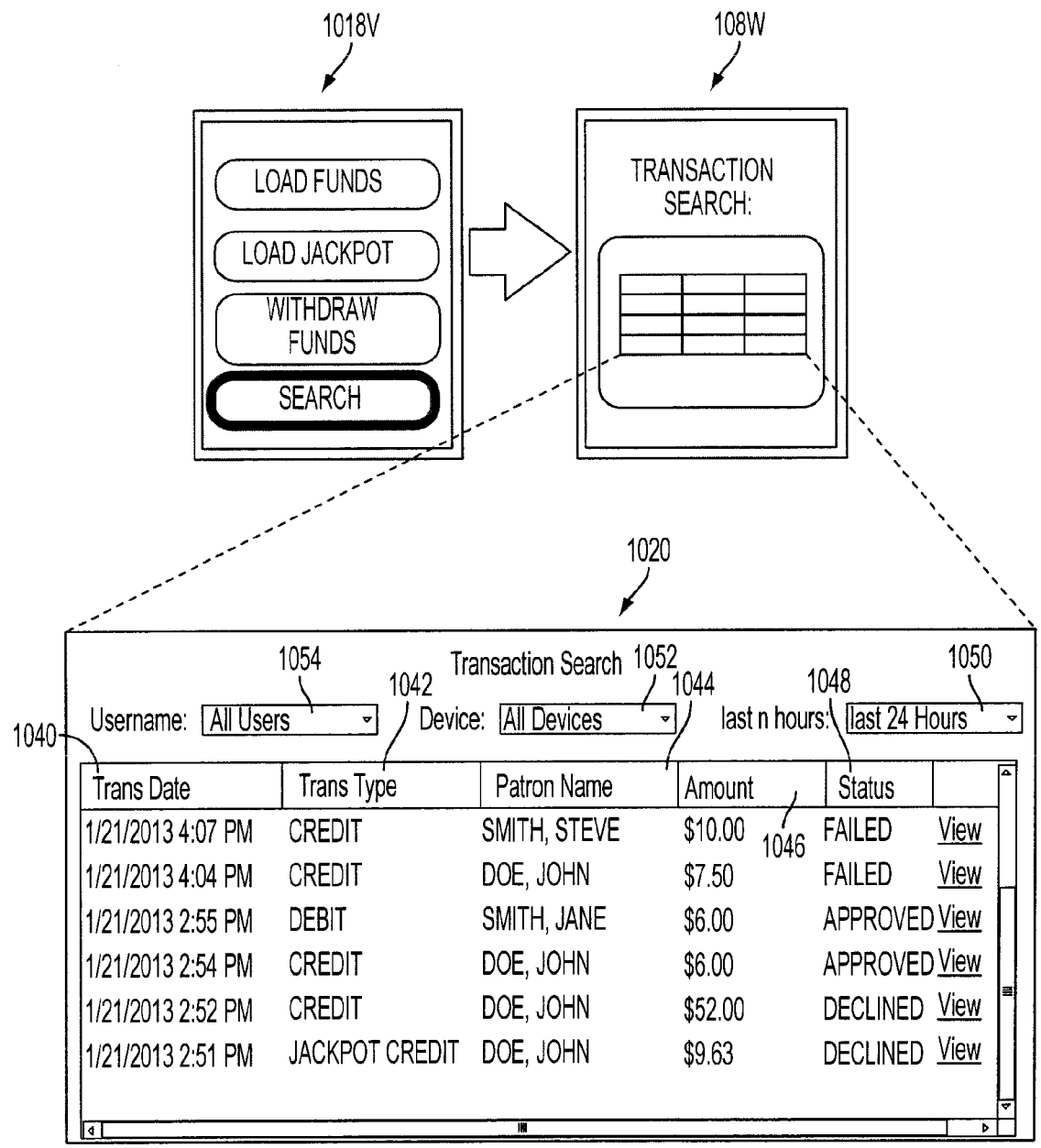

Referring now to screen 1018V of FIG. 14, the "search" option has been selected. Selection of the search option accesses a transaction database 1020 that is displayed on 1018W. It is noted that the transaction database 1020 illustrated in FIG. 14 has been simplified for the sake of clarity. The transaction database 1020 may be maintained by the transaction facilitator 1090 or may be stored by the computing device 1012 or associated computing system. In any event, the transaction database 1020 stores transactions processed by the transaction facilitator 1090 and allows sorting or searching by transaction date 1040, transaction type 1042, patron name 1044, transaction amount 1046, and transaction status 1048. Additionally, the data can be manipulated based on username 1054, device type 1052, and based on a time period 1050.

Figure 15:
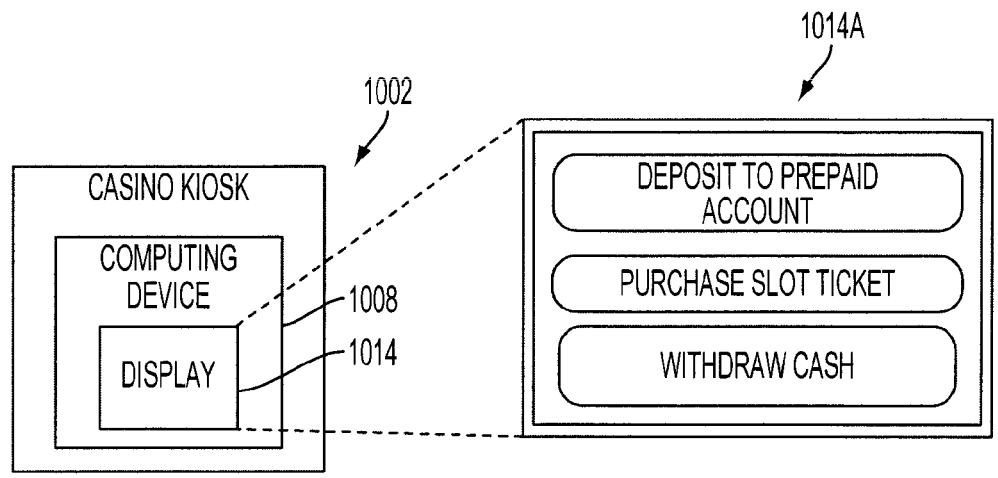
FIG. 15 depicts an example user interface screen on a display of a computing device that is associated with an unattended casino kiosk.

FIG. 15 depicts an example user interface screen 1014A of the display 1014 of the computing device 1008 that is associated with an unattended casino kiosk 1002. The casino kiosk 1002 can be any suitable kiosk, such as an ATM-Ticket redemption machine or a kiosk dedicated to stored value payment card-related processing. As shown by screen 1014A, example functionality offered at this computing device include the ability for the player to deposit funds to their prepaid account, purchase slot tickets with funds from their prepaid account, and withdraw cash.

Figure 16:
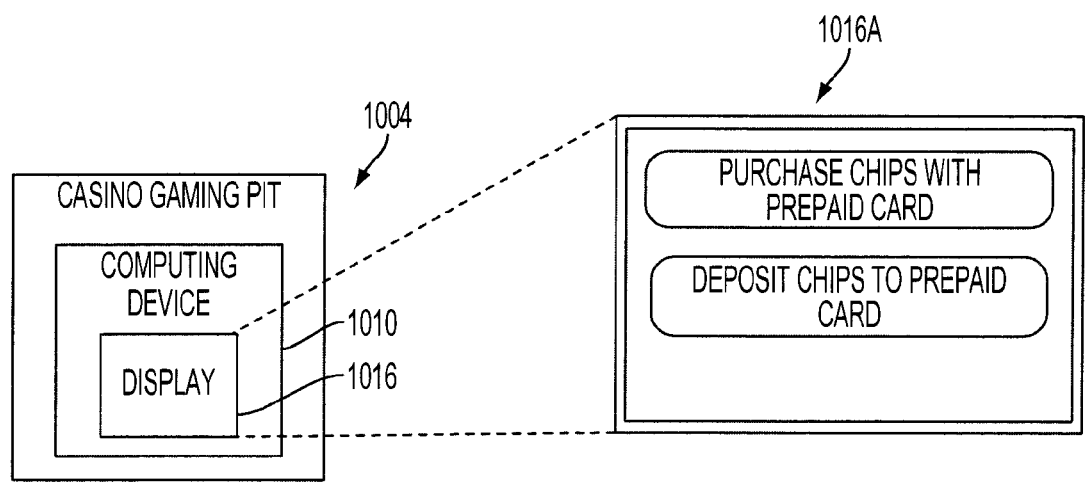
FIG. 16 depicts an example user interface screen on a display of a computing device that is associated with a casino gaming pit.

FIG. 16 depicts an example user interface screen 1016A of the display 1016 of the computing device 1010 that is associated with a casino gaming pit 1004. As shown by screen 1016A, example functionality offered at this computing device include the ability for the player to purchase chips with funds on their prepaid card and deposit chips to their prepaid card.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration of the invention for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as set forth in the appended claims.

The invention claimed is:

1. A poker gameplay funding system, comprising:
a stored value account of a player, wherein funds maintained in the stored value account by an issuer processor computing system are accessible through a payment network;
a gaming account to hold funds for the player usable by the player for poker gameplay funding;
at least one computing device comprising a processor and non-transitory computer readable medium having instructions stored thereon which when executed by a processor cause the processor to:
receive a funding instruction from another computing device, wherein the funding instructions identifies an amount of funds to be transferred from the stored value account to the gaming account, and
based on the amount of funds identified in the funding instruction, cause the funds held by the gaming account to be increased and the funds maintained in the stored value account by the issuer processor computing system to be decreased.

2. The poker gameplay funding system of claim 1 further comprising:
a poker management computing system, wherein the poker management computing system is configured to monitor the poker gameplay funding.

3. The poker gameplay funding system of claim 2, wherein the poker management computing system is configured to monitor poker gameplay of a virtual poker room.

4. The poker gameplay funding system of claim 2, wherein the poker management computing system is configured to monitor poker gameplay of a brick-and-mortar poker room.

5. The poker gameplay funding system of claim 1, wherein the poker gameplay funding is a cash buy-in for the player.

6. The poker gameplay funding system of claim 1, wherein the poker gameplay funding is a tournament buy-in for the player.

7. The poker gameplay funding system of claim 1, wherein the increase of funds of the gaming account occurs subsequent to a delay.

8. The poker gameplay funding system of claim 1, wherein the increase of the funds of the gaming account and decrease the funds of the stored value account occurs substantially in real-time.

9. The poker gameplay funding system of claim 1, wherein the funds held by the gaming account are only usable by the player for the poker gameplay funding of poker games affiliated with a brand.

10. The poker gameplay funding system of claim 9, wherein the brand is one of a gaming brand and a non-gaming brand.

11. The poker gameplay funding system of claim 1, wherein the instructions further cause the processor to: selectively cause the funds held by the gaming account to be decreased and the funds maintained in the stored value account to be increased.

12. The poker gameplay funding system of claim 11, wherein the increase of funds of the stored value account is based on an amount of poker winnings.

13. The poker gameplay funding system of claim 12, wherein the winnings are one of tournament play poker winnings and cash game poker winnings.

14. A computer-based method of funding poker gameplay, the method performed by one or more computing devices comprising instructions stored in a memory, which when executed by one or more processors of the one or more computing devices, cause the one or more computing devices to perform the method comprising:
receiving player credentials for a player, wherein the player credentials are associated with a gaming account of the player having a balance maintained by a casino computing system;
identifying a stored value account associated with the player based at least partially on the received player credentials, wherein a balance of the stored value account is maintained by an issuer processor computing system that is in electronic communication with the one or more computing devices;
receiving a poker gameplay funding instruction, wherein the funding gameplay instruction identifies a balance amount to be transferred from the stored valued account of the player to the gaming account of the player; and
causing a decrease of the balance of the stored value account maintained by the issuer processor computing system and an increase of the balance of the gaming account, wherein the balance of the gaming account is usable by the player for poker gameplay funding.

15. The computer-based method of claim 14, wherein the balance amount comprises at least a poker buy-in amount.

16. The computer-based method of claim 15, wherein the poker buy-in amount is for one of tournament poker play and cash game poker play.

17. The computer-based method of claim 14, wherein the balance amount comprises an amount for a bundled poker package.

18. The computer-based method of claim 14, wherein the balance of the gaming account is only usable by the player for the poker gameplay funding of poker games affiliated with a brand.

19. A computer-based method of funding an account associated with a player, the method performed by a transaction facilitator computing system comprising instructions stored in a memory, which when executed by a processor of the transaction facilitator computing system, cause the transaction facilitator computing system to perform the method comprising:
receiving a poker gameplay funding request from a remote computing device, wherein the poker gameplay funding request comprises a request to fund a gaming account of a player with player funds held by a stored value account maintained by an issuer processor computing system, wherein the gaming account has a balance amount usable by the player for poker gameplay funding;
causing an increase of the balance amount of the gaming account based on an amount of funds requested in the poker gameplay funding request, and causing a decrease of the player funds of the stored value account based at least partly on the amount of funds requested in the poker gameplay funding request.

20. The computer-based method of claim 19, wherein the amount of funds comprises a tournament poker buy-in amount.

21. The computer-based method of claim 19, wherein the amount of funds comprises a bundled poker package amount.

22. The computer-based method of claim 19, wherein the remote computing device is any of a mobile computing device, a smart phone, a tablet computer, a desktop computer, a laptop computer, a gaming device, poker management computing system, a casino cage computing device, a wearable computing device, a kiosk, and an automated transaction machine (ATM).

* * * * *